United States Patent
Cha et al.

(10) Patent No.: US 11,237,741 B2
(45) Date of Patent: Feb. 1, 2022

(54) ELECTRONIC DEVICE AND CONTROL METHOD FOR CONTROLLING MEMORY

(71) Applicant: Samsung Electronics Co., Ltd., Suwon-si (KR)

(72) Inventors: Hyun Joon Cha, Suwon-si (KR); Chulmin Kim, Suwon-si (KR); Jaewon Kim, Suwon-si (KR); Taeho Kim, Suwon-si (KR); Sooyong Suk, Suwon-si (KR); Yongtaek Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/971,580

(22) PCT Filed: Feb. 13, 2019

(86) PCT No.: PCT/KR2019/001738
§ 371 (c)(1),
(2) Date: Aug. 20, 2020

(87) PCT Pub. No.: WO2019/164172
PCT Pub. Date: Aug. 29, 2019

(65) Prior Publication Data
US 2020/0393982 A1    Dec. 17, 2020

(30) Foreign Application Priority Data
Feb. 23, 2018    (KR) .................. 10-2018-0022267

(51) Int. Cl.
*G06F 12/00* (2006.01)
*G06F 3/06* (2006.01)
*G06F 12/123* (2016.01)

(52) U.S. Cl.
CPC ............ *G06F 3/0631* (2013.01); *G06F 3/061* (2013.01); *G06F 3/0604* (2013.01);
(Continued)

(58) Field of Classification Search
CPC ...... G06F 3/0646; G06F 3/0683; G06F 3/061; G06F 3/0614; G06F 3/0617;
(Continued)

(56) References Cited

U.S. PATENT DOCUMENTS

2006/0212657 A1*   9/2006   Tuel .................... G06F 12/0276
                                                                711/133
2010/0299513 A1   11/2010   Ryu et al.
(Continued)

FOREIGN PATENT DOCUMENTS

KR          10-1562973 A      12/2010
KR    10-2014-0065196 A      5/2014
(Continued)

OTHER PUBLICATIONS

Virtual Memory; (https://www.cs.uic.edu/~jbell/CourseNotes/OperatingSystems/9_VirtualMemory.html; Jun. 17, 2020.
(Continued)

*Primary Examiner* — John A Lane
(74) *Attorney, Agent, or Firm* — Jefferson IP Law, LLP

(57) ABSTRACT

An electronic device and a control method for controlling a memory are provided. An electronic device according to various embodiments of the present disclosure may comprise: a housing; a communication circuit; at least one processor operatively connected to the communication circuit; a non-volatile memory operatively connected to the processor and configured to store at least one file; and a volatile memory operatively connected to the processor, wherein the non-volatile memory stores instructions configured, when executed, to cause the processor to establish a (Continued)

first area and a second area on the volatile memory; store only first type data associated with the at least one file in the first area; store the first type data and/or store at least one second type data that is not associated with the at least one file, in the second area; receive a request for storing one of the at least one second type data, which exceeds a selected threshold value; and when the request is received, cause the first area to be in a state for storing the one of the at least one second type data, instead of the first type data.

15 Claims, 17 Drawing Sheets

(52) U.S. Cl.
CPC .......... *G06F 3/0614* (2013.01); *G06F 3/0617* (2013.01); *G06F 3/0643* (2013.01); *G06F 3/0646* (2013.01); *G06F 3/0673* (2013.01); *G06F 3/0683* (2013.01); *G06F 12/123* (2013.01)

(58) Field of Classification Search
CPC .... G06F 12/123; G06F 3/0647; G06F 3/0631; G06F 3/0604; G06F 3/0673
See application file for complete search history.

(56) References Cited

U.S. PATENT DOCUMENTS

| | | |
|---|---|---|
| 2014/0143518 A1 | 5/2014 | Kim et al. |
| 2014/0189272 A1 | 7/2014 | Shin |
| 2016/0170659 A1* | 6/2016 | Golander ................ G06F 16/18 711/158 |
| 2016/0342529 A1* | 11/2016 | Liao ........................ G06F 12/12 |
| 2017/0228155 A1* | 8/2017 | Shirota ................... G06F 3/061 |
| 2019/0056883 A1 | 2/2019 | Kim et al. |
| 2019/0155792 A1 | 5/2019 | Jeong et al. |

FOREIGN PATENT DOCUMENTS

| | | |
|---|---|---|
| KR | 10-2017-0092912 A | 8/2017 |
| KR | 10-2017-0136366 A | 12/2017 |

OTHER PUBLICATIONS

Controlling Memory Footprint at All Layers: Linux Kernel, Applications, Libraries, and Toolchain (https://www.slideshare.net/peknap/controlling-memory-footprint-at-all-layers-linux-kernel-applications-libraries-and-toolchain); May 8, 2012.
CAUSE: Critical Application Usage-Aware Memory System using Non-volatile Memory for Mobile Devices; Jan. 7, 2016.

* cited by examiner

ELECTRONIC DEVICE AND CONTROL METHOD FOR CONTROLLING MEMORY

CROSS-REFERENCE TO RELATED APPLICATION(S)

This application is a U.S. National Stage application under 35 U.S.C. § 371 of an International application number PCT/KR2019/001738, filed on Feb. 13, 2019, which is based on and claims priority of a Korean patent application number 10-2018-0022267, filed on Feb. 23, 2018, in the Korean Intellectual Property Office, the disclosure of each which is incorporated by reference herein in its entirety.

TECHNICAL FIELD

The present disclosure relates to an electronic device and a control method for controlling a memory.

BACKGROUND ART

Various services and additional functions provided by electronic devices, e.g., portable electronic devices such as smartphones have been gradually diversified. To improve the utility value of electronic devices and meet various demands of users, communication service providers or electronic device manufacturers have competitively developed electronic devices to provide various functions and to differentiate electronic devices from electronic devices of other companies. As a result, various functions provided through electronic devices have gradually become more sophisticated.

DETAILED DESCRIPTION OF THE INVENTION

Technical Problem

For example, a portable electronic device such as a smartphone may have a resource limitation such as a low central processing unit (CPU) processing speed, a small memory size, a reduced power, etc., when compared to a computing device such as a personal computer (PC). However, due to the increasing level of user demand for portable electronic devices and rapid development of mobile environments, functions requiring a large-size memory for execution thereof, such as high-resolution image processing in a portable electronic device, providing of a user environment like virtual reality, a camera supporting an ultra-high resolution, etc., have been increasing.

When a function (or functions) requiring a large-size memory is used in a portable electronic device, a failure in securing a memory area for executing the function may result in a failure in quickly providing the function to a user. Thus, to rapidly secure a large-size memory area, various schemes have been provided such as, for example, a scheme in which an operation of deleting pages including a backing store from a memory and sending pages without the backing store to a swap area in a swap manner is repeated to secure a requested memory area, a scheme in which a space (e.g., a reserved area) for executing a certain function on the memory is separately provided, etc. However, according to the scheme in which the reserved area is provided, the reserved area is not available to a processor, such that a total size (or area) of the memory, available to a user of the electronic device, may be reduced.

According to various embodiments of the present disclosure, when memory allocation is performed for a process requiring a large memory size (e.g., 200 Mb or more) for execution of the process (e.g., execution of a camera application), at least one of the pages allocated to a designated area (e.g., a first area) of the memory may be dropped and pages related to execution of the process are allocated to the designated area of the memory, thereby making it possible to rapidly execute the process without wasting the memory.

Technical Solution

An electronic device according to various embodiments of the present disclosure includes a first memory, a second memory, and a processor operatively connected to the first memory and the second memory, in which the processor is configured to access at least one page stored in the second memory, the at least one page being subject to paging-in, in response to a page-in trigger event identified during execution of a first process, to page-in the at least one page in a first area of the first memory at least partially based on a partition type in which the at least one page is stored, to execute a second process in response to an execution request of the second process, to determine whether the second process satisfies a designated condition, to drop the at least one page mapped to the first area from the memory according to the page-in, at least partially based on a result of the determination, and to allocate at least one page required for execution of the second process to the first area.

An electronic device according to various embodiments of the present disclosure includes a housing, a communication circuit, at least one processor operatively connected with the communication circuit, a non-volatile memory operatively connected with the processor and storing at least one file, and a volatile memory operatively connected to the processor, in which the non-volatile memory stores instructions that cause, when executed, the processor, to establish a first area and a second area on the volatile memory, to store data of a first type related to the at least one file in the first area, to store data of at least one second type that is not related to the data of the first type and/or the at least one file in the second area, to receive a request for storing one of the data of the at least one second type, which exceeds a selected threshold value, and to control the first area to be in a state of storing one of the data of the at least one second type instead of the data of the first type, upon receipt of the request.

A control method for an electronic device according to various embodiments of the present disclosure includes accessing at least one page that is subject to paging-in, in response to a page-in trigger event identified during execution of a first process, paging-in the at least one page in a first area of a first memory at least partially based on a partition type in which the at least one page is stored, the at least one page being stored in a second memory, executing a second process in response to an execution request of a second process, determining whether the second process satisfies a designated condition, dropping the at least one page mapped to the first area from the first memory according to the page-in, at least partially based on a result of the determination, and allocating at least one page required for execution of the second process to the first area.

A memory operatively connected with a processor includes a first area for recording an anonymous page and a second area for recording a read-only page, in which the memory receives a first control signal for paging-in a first page loaded from a designated partition of a second memory in the first area during execution of a first process, pages-in the first page in the first area upon receipt of the first control signal, receives a second control signal for allocating a second page required for execution of a designated process in the first area from the processor, drops the first page allocated to the first area upon receipt of the second control signal, and allocates the second page to the first area.

Advantageous Effects

According to various embodiments of the present disclosure, large-size (e.g., 200 Mb) memory allocation is required for execution of a process (e.g., a camera application), at least one of the pages allocated to a designated area (e.g., the first area) of a memory may be dropped and then the process may be allocated to the designated area of the memory, enabling stable memory allocation for the large-size process and thus providing an electronic device having an improved system performance and a control method.

Effects according to various embodiments of the present disclosure are not limited to the described effects, and it would be obvious to those of ordinary skill in the art that various effects are included in the present disclosure.

MODE FOR CARRYING OUT THE INVENTION

Figure 1:
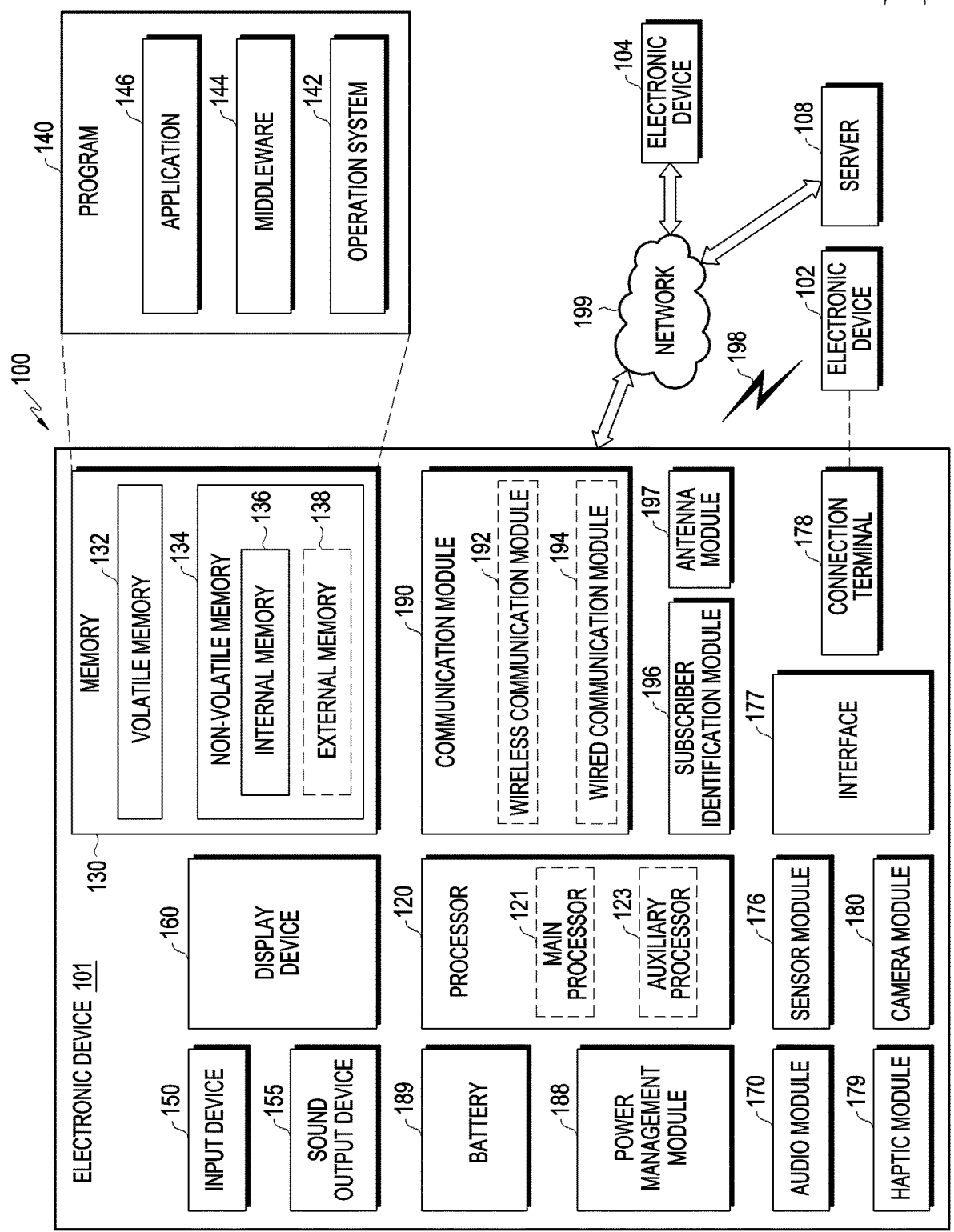
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
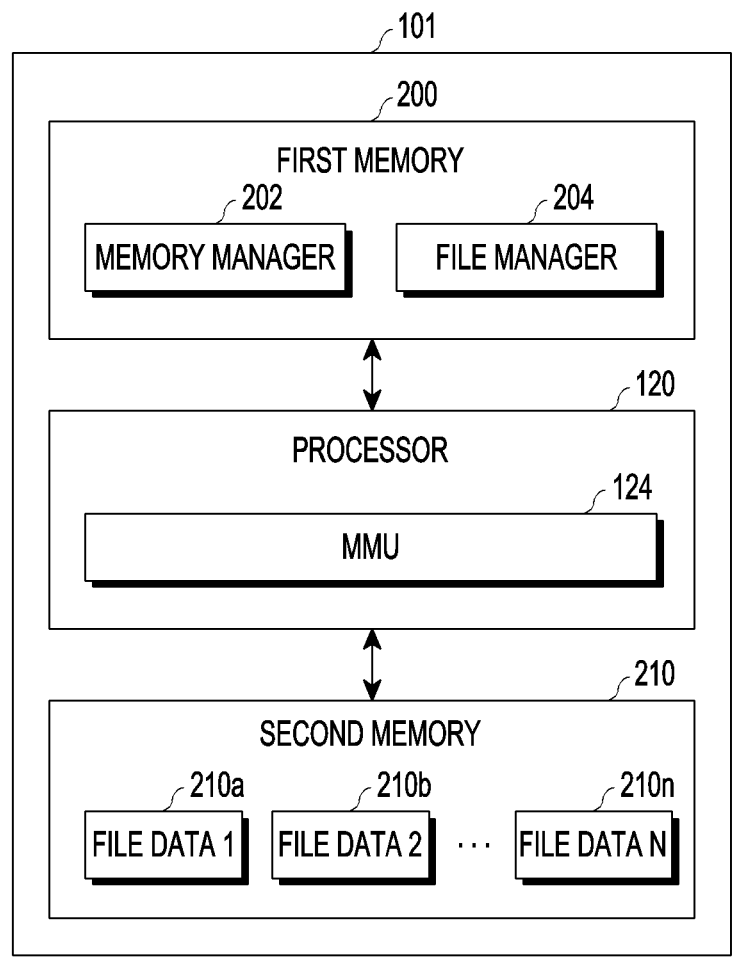
FIG. 2 is a diagram for describing an electronic device according to various embodiments.

FIG. 2 is a diagram for describing the electronic device 101 according to various embodiments.

Referring to FIG. 2, the electronic device 101 according to various embodiments of the present disclosure may include the processor 120, a first memory 200, and a second memory 210.

The processor 120 according to various embodiments of the present disclosure may drive, for example, software (e.g., the program 140 of FIG. 1, a memory manager 202, and a file manager 204) to control the first memory 200 and the second memory 210, and perform various data processing and operations. The processor 120 according to various embodiments of the present disclosure may include a memory management unit (MMU) 124. The MMU 124 according to various embodiments of the present disclosure may translate a virtual address into a physical address when the processor 120 accesses the memory. The MMU 124 according to various embodiments of the present disclosure may access a page table stored in the first memory 200 for address translation. In the page table according to various embodiments of the present disclosure, a mapping relationship between the virtual address and the physical address may be defined in the unit of a page (e.g., 4 kB). The MMU 124 according to various embodiments of the present disclosure may include a translation lookaside buffer (TLB). While FIG. 2 shows an embodiment where the MMU 124 according to various embodiments of the present disclosure is included in the processor 120, this is merely an example such that the MMU 124 may be located outside the processor 120.

The first memory 200 according to various embodiments of the present disclosure may include a volatile memory (e.g., the volatile memory 132 of FIG. 1). The first memory 200 according to various embodiments of the present disclosure, which is a main memory, may store the memory manager 202 and the file manager 204. The first memory 200 according to various embodiments of the present disclosure may be managed (e.g., stored, deleted, accessed, etc.) in the unit of a physical page (or a page frame).

The memory manager 202 according to various embodiments of the present disclosure may manage data stored in the first memory 200. For example, the memory manager 202 may load (allocate) or unload data in or from the first memory 200 in the unit of a page and translate a virtual address. For example, the memory manager 202 may manage (e.g., access, update, delete, etc.) memory mapping information (e.g., a page table) stored in the first memory 200 under control of the processor 120. The memory manager 202 according to various embodiments of the present disclosure may provide information (e.g., a physical address corresponding to a virtual address) related to a page table to the processor 120 at the request of a processor (e.g., the MMU 124). According to an embodiment, the memory manager 202 may manage a physical storage area of the first memory by dividing the physical storage area into at least one zone, and manage the first memory such that pages having similar characteristics are stored separately according to zone. The file manager 204 according to various embodiments of the present disclosure may manage file mapping information (e.g., mapping information between a page cached in the first memory 200 and a file stored in the second memory 210) under control of the processor 120. The file mapping information according to various embodiments of the present disclosure may be managed by the memory manager 202 and/or the file manager 204. The file mapping information managed by the memory manager 202 according to various embodiments of the present disclosure may refer to file information stored (e.g., included) in the file manager 240. The file manager 204 according to various embodiments of the present disclosure may be mentioned as the term "file system". The file system according to various embodiments of the present disclosure may include various file systems such as a file allocation table (FAT), a virtual file system (VFS), etc.

The second memory 210 according to various embodiments of the present disclosure may be configured to store a data block in which data (e.g., file data (e.g., file data 1 210a, file data 2 210b, . . . , file data n 210)) is stored. The file manager 204 according to various embodiments of the present disclosure may manage data stored in the second memory 210. The second memory 210 according to various embodiments of the present disclosure may include a non-volatile memory. The non-volatile memory according to various embodiments of the present disclosure may include various non-volatile memories such as read only memory (ROM0, flash memory, sold state drive (SSD), embedded multimedia card (eMMC), universal flash storage (UFS), etc. The "second memory 210" according to various embodiments of the present disclosure may be mentioned as the term "storage".

Figure 3A:
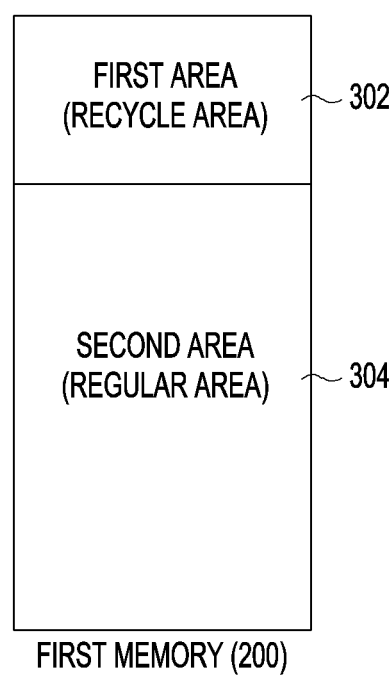
FIG. 3A is a diagram for describing a first memory according to various embodiments.

FIG. 3A is a diagram for describing the first memory 200 according to various embodiments.

Referring to FIG. 3A, the first memory 200 (e.g., a physical memory) according to various embodiments of the present disclosure may include a first area 302 and a second area 304. The first memory 200 according to various embodiments of the present disclosure may include the first area 302 and the second area 304 that are physically or logically divided. The processor (e.g., kernel) according to various embodiments of the present disclosure may divide the first memory 200 into areas by allocating physically consecutive empty frames (e.g., zones) on the first memory 200.

In the first area 302 according to various embodiments of the present disclosure, a read-only page and/or at least one page related to a process (which may be mentioned as the term "large-size process" for convenience of a description in the present disclosure) requiring allocation of a memory exceeding a designated size (e.g., 200 Mb) in execution of the process may be stored. The large-size process according to various embodiments of the present disclosure may include various processes such as a process corresponding to execution of a designated application (e.g., a camera application or a security application (e.g., Samsung® Knox™, etc.) related to security of the electronic device 101), a process for executing digital signal processing (DSP), etc. The large-size process according to various embodiments of the present disclosure may be preset by a manufacturer or a provider. When a page-in operation is performed on a certain process, at least one page stored in a designated partition (e.g., a system partition (/sys)) of a second memory (e.g., the second memory 210 of FIG. 2) is allocated to the first area 302 according to various embodiments of the present disclosure.

The first area 302 according to various embodiments of the present disclosure may be configured to have a designated size rate (e.g., 15%) with respect to a total size of the first memory 200. The first area 302 according to various embodiments of the present disclosure may be configured to have a designated number of page frames among total page frames included in the first memory 200. The first area 302 according to various embodiments of the present disclosure may be configured to have address values (e.g., 0x00011111 through 0x000FFFFF) in a certain range among address values allocated to the first memory 200. According to various embodiments, the term "first area" may be mentioned as the term "recycle area".

In the second area 304 according to various embodiments of the present disclosure, an anonymous page and/or at least one page related to a process (which may be mentioned as the term "normal process" for convenience of a description in the present disclosure) requiring allocation of a memory less than or equal to the designated size in execution of the process may be stored. When a page-in operation is performed on a certain process, at least one page stored in a designated partition (e.g., a partition other than the system partition (/sys)) of a second memory (e.g., the second memory 210 of FIG. 2) is allocated to the second area 304 according to various embodiments of the present disclosure. According to various embodiments, the term "second area" may be mentioned as the term "regular area".

According to various embodiments of the present disclosure, the size of the first area or the second area may be changed by a user. For example, the electronic device (e.g., the electronic device 101 of FIG. 1) may provide a user interface (e.g., an icon) for controlling a size of the first area 302 and/or the second area 304 to the user through a display device (e.g., the display device 160 of FIG. 1). The electronic device (e.g., the electronic device 101 of FIG. 1) according to various embodiments of the present disclosure may receive an input for controlling (or changing) the size of the memory area 202 and/or the size of the second area 304 from the user through the user interface. The electronic device (e.g., the electronic device 101 of FIG. 1) according to various embodiments of the present disclosure may change the size of the first area 302 and/or the size of the second area 304 according to the received user input.

Figure 3B:
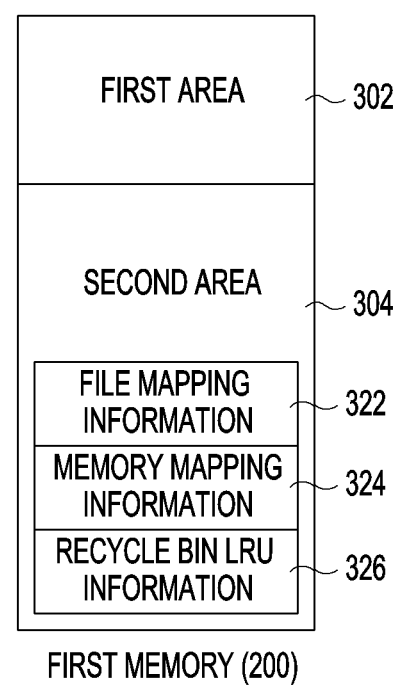
FIG. 3B is a diagram for describing information stored in a second area of a first memory according to various embodiments.

FIG. 3B is a diagram for describing information stored in the second area 304 of the first memory 200, according to various embodiments. Referring to FIG. 3B, in the second area 304 of the first memory 200 according to various embodiments of the present disclosure, file mapping information 322, memory mapping information 324, and recycle bin least recently used (LRU) information 326 may be stored.

The file mapping information 322 according to various embodiments of the present disclosure may be stored in the second area 304 of the first memory 200. The file mapping information 322 according to various embodiments of the present disclosure may be managed by a memory manager (e.g., the memory manager 202 of FIG. 2) and/or a file manager (e.g., the file manager 204 of FIG. 2). The processor (e.g., the file manager 204) according to various embodiments of the present disclosure may cache (e.g., copy) a file stored in the second memory (e.g., storage) 210 on the first memory 200 according to a file access request (e.g., file read, file write, file memory mapping, etc.) corresponding to execution of a certain application. File data (or a data block) of the second memory 210 cached on the first memory 200 according to various embodiments of the present disclosure may be mentioned as a "page cache". The processor (e.g., the memory 202 of FIG. 2) according to various embodiments of the present disclosure may manage information about at least one page cache stored in the first memory 200. The memory manager according to various embodiments of the present disclosure may manage the file mapping information 322 including information about a position (e.g., a position of a block in which file data is stored) of at least one page cache in the second memory 210. The file mapping information 322 according to various embodiments of the present disclosure may include information indicating a position relationship between page caches stored in the first memory 200 and file data stored in the second memory 210. According to various embodiments of the present disclosure, a certain application (or the memory manager 202) currently executed in an electronic device (e.g., the electronic device 101 of FIG. 1) may allocate file data stored in the second memory 210 to a certain address area of the first memory 200 by using the file mapping information 322.

The memory mapping information 324 according to various embodiments of the present disclosure may be stored in the second area 304 of the first memory 200. The memory mapping information 324 according to various embodiments of the present disclosure may include information about a mapping relationship between a virtual address (or a virtual memory) and a physical address (or a physical memory). The memory mapping information 324 according to various embodiments of the present disclosure may include a "page table structure" (or a "page table"). The file mapping information 324 according to various embodiments of the present disclosure may be managed by the memory manager 202.

The recycle bin LRU information 326 according to various embodiments of the present disclosure may be stored in the second area 304 of the first memory 200. The recycle bin LRU information 326 according to various embodiments of the present disclosure may include a recycle bin LRU list for at least one page allocated to the first area 302 of the first memory 200. The recycle bin LRU information 326 according to various embodiments of the present disclosure may mean an LRU list for at least one page allocated to the first area 302. The recycle bin LRU information 326 (e.g., the recycle bin LRU list) according to various embodiments of the present disclosure may include information about at least one of the pages that are recently allocated to the first area 302 or used. In the recycle bin LRU information 326 (e.g., the recycle bin LRU list) according to various embodiments of the present disclosure, the information about the at least one of the pages may be sequentially stored in an order allocated to the first area 302 and/or in an order of accesses by the processor. Thus, in the information about the at least one page stored in the recycle bin LRU information 326 (e.g., the recycle bin LRU list) according to various embodiments of the present disclosure, the first information (e.g., arranged in a descending order of allocation (or use) to the first area 302) or the last information (e.g., arranged in an ascending order of allocation (or use) to the first area 302) may indicate information about a page most recently allocated to the first area 302.

The recycle bin LRU information 326 according to various embodiments of the present disclosure may be used to store at least one page dropped (or evited or deleted) from the first area 302 in the first area 302 after termination of execution of the large-size process. According to various embodiments of the present disclosure, by referring to the LRU list (e.g., the recycle bin LRU list) for at least one page dropped from the first area 302, the recycle bin LRU information 326 may be used to store (e.g., reconstruct) the dropped at least one page in the first area 302. Thus, a time required for the processor 120 to re-access a page dropped from the first area 302 may be reduced. An attribute of the recycle bin LRU information 326 according to various embodiments of the present disclosure may be an LRU having an attribute of an active LRU. The recycle bin LRU information 326 according to various embodiments of the present disclosure may be managed by the memory manager 202 of a processor (e.g., the processor 120 of FIG. 1).

Figure 4:
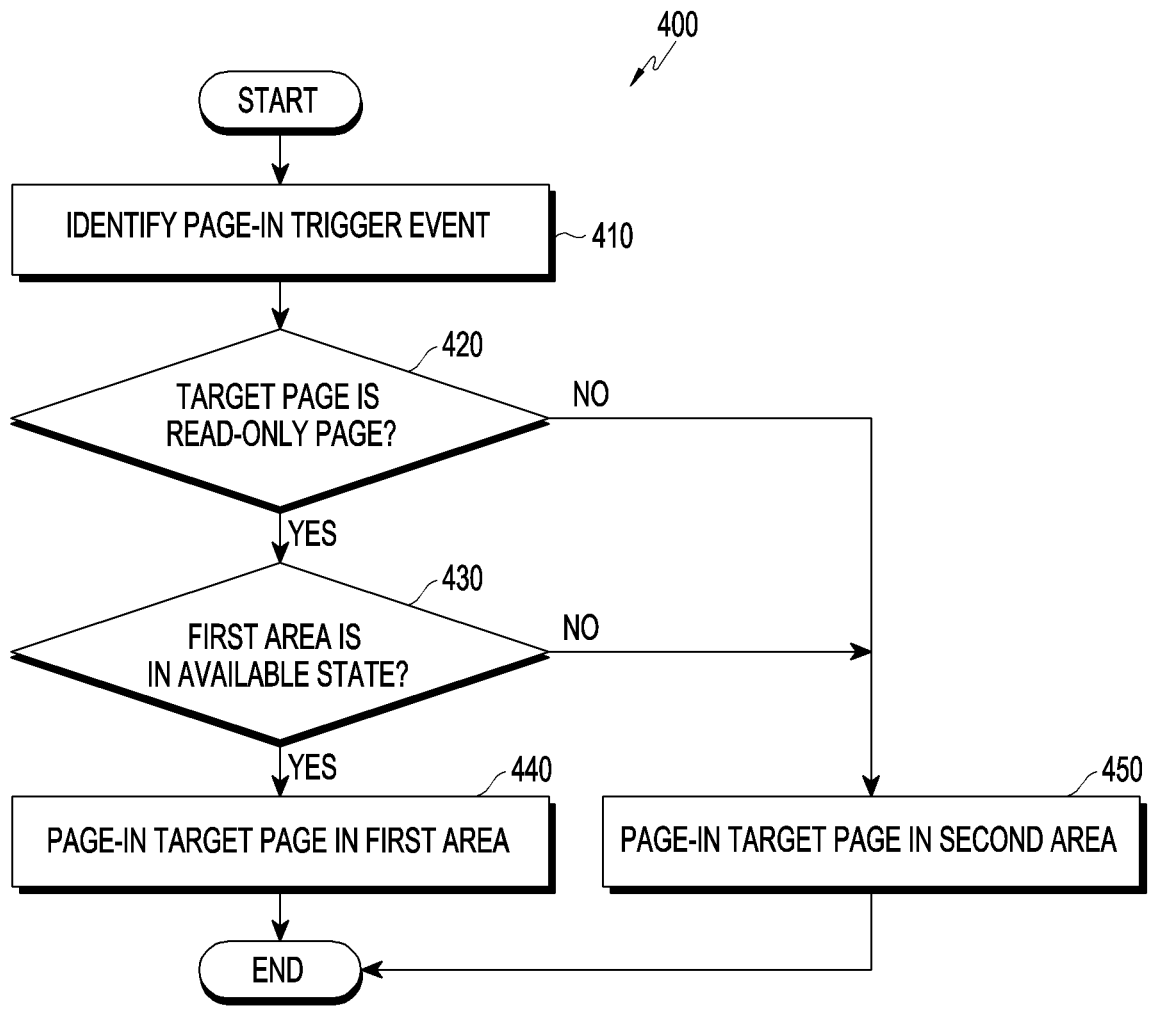
FIG. 4 is a flowchart for describing an operating method of an electronic device, according to various embodiments.

FIG. 4 is a flowchart 400 for describing a page-in operation according to various embodiments.

Operations 410 through 450 according to various embodiments of the present disclosure may be executed by any one of an electronic device (e.g., the electronic device 101 of FIG. 1), a processor (e.g., the processor 120 of FIG. 1), or a program (e.g., the program 140 of FIG. 1). Operations 410 through 340 according to various embodiments of the present disclosure may be understood as operations executed by a kernel under control of the processor (e.g., the processor 120 of FIG. 1).

Referring to FIG. 4, in operation 410, a processor (e.g., the processor 120 of FIG. 1) according to various embodiments of the present disclosure may identify occurrence of a page-in trigger event (or a page-in request). The page-in trigger event according to various embodiments of the present disclosure may include a page-in request corresponding to a certain process during execution of the certain process (e.g., the camera application). The electronic device (e.g., the processor 120 of FIG. 1) according to various embodiments of the present disclosure may access at least one page (e.g., the file data 1210a and the file data 2 210b of FIG. 2) stored in the second memory (e.g., the second memory 210 of FIG. 2) to execute page-in upon occurrence of a page-in trigger event.

In operation 420, the electronic device (e.g., the processor 120 of FIG. 1) according to various embodiments of the present disclosure may determine whether at least one page that is subject to paging-in (which may be mentioned as a "target page" herein) is a page having a read attribute (e.g., a read-attribute page, which may be mentioned as a "read-only page").

The read-only page according to various embodiments of the present disclosure may include a page having a backing store (e.g., the second memory 210 of FIG. 2). For example, the read-only page according to various embodiments of the present disclosure may include a page corresponding to file data stored in a designated partition. The designated partition according to various embodiments of the present disclosure may include a system partition (e.g., /sys). In the system partition according to various embodiments of the present disclosure, device information about various hardware included in the electronic device 101 (e.g., inter-hardware connection information, device driver information allocated to hardware, information about a kernel module loaded on hardware, etc.) may be stored. The processor 120 according to various embodiments of the present disclosure may identify (or process) the at least one page stored in the system partition (e.g., /sys) as a page having a read-only attribute. Alternatively, for example, the read-only page according to various embodiments of the present disclosure may include a page allocated (or used) by a certain process (e.g., a text page and/or a data page of an execution file (or a library)).

The processor (e.g., the processor 120 of FIG. 1) according to various embodiments of the present disclosure may identify a page having no backing store (e.g., a page allocated as "malloc( )") as an anonymous page. The anonymous page according to various embodiments of the present disclosure may be implemented to have the backing store (e.g., a swap file, a swap partition, etc.) according to a configuration of an operating system (OS).

In operation 430, the electronic device (e.g., the processor 120 of FIG. 1) according to various embodiments of the present disclosure may determine whether the first area of the first memory (e.g., the first memory 200 of FIG. 2) is in an available state for page-in with respect to at least one page, when the at least one page is identified as the read-only page (yes in operation 420). The processor (e.g., the processor 120 of FIG. 1) according to various embodiments of the present disclosure may determine whether a free page frame (or a free frame) exists in the first area, to determine whether the first area is in the available state. In the present disclosure, according to various embodiments, the term, "page-in" may be understood or mentioned as various terms such as "storing in the memory", "loading in the memory", "caching in the memory", etc.

In operation 440, the electronic device (e.g., the processor 120 of FIG. 1) according to various embodiments of the present disclosure may page-in the at least one page for page-in in the first area when determining in operation 430 that the first area is available (yes in operation 430). According to various embodiments of the present disclosure, even when the electronic device determines in operation 430 that the first area is currently in the available state, the area determined to be available may be insufficient to page in all of a plurality of pages. In this case, although not shown, the electronic device (e.g., the processor 120 of FIG. 1) may page-in some of the plurality of pages in the first area and page-in the other page/pages in the second area within a range of page-in possible in the first area. Through such operations, in execution of a process requiring a certain memory size (e.g., 200 MB (megabyte)) due to execution of the process, a time required for memory allocation may be reduced (e.g., from 1 second (comparative example) to 66 ms).

According to various embodiments of the present disclosure, the electronic device (e.g., the processor 120 of FIG. 1) according to various embodiments of the present disclosure may page-in the at least one page, which is subject to paging-in, in the second area when determining that the at least one page is not the read-only page (no in operation 420). An operating method of the electronic device (e.g., the electronic device 101 of FIG. 1) according to various embodiments of the present disclosure may include operation 450 in which when the electronic device (e.g., the processor 120 of FIG. 1) determines in operation 430 that the first area (e.g., the first area 302 of FIG. 3A) is not available (no in operation 430), the electronic device may page-in the at least one page for page-in in the second area (e.g., the second area 304 of FIG. 3A). According to various embodiments of the present disclosure, "no in operation 430" may include a case where paging-in of all of the at least one page that is subject to paging-in in the first area (e.g., the first area 302 of FIG. 3A) is not possible.

Figure 5A:
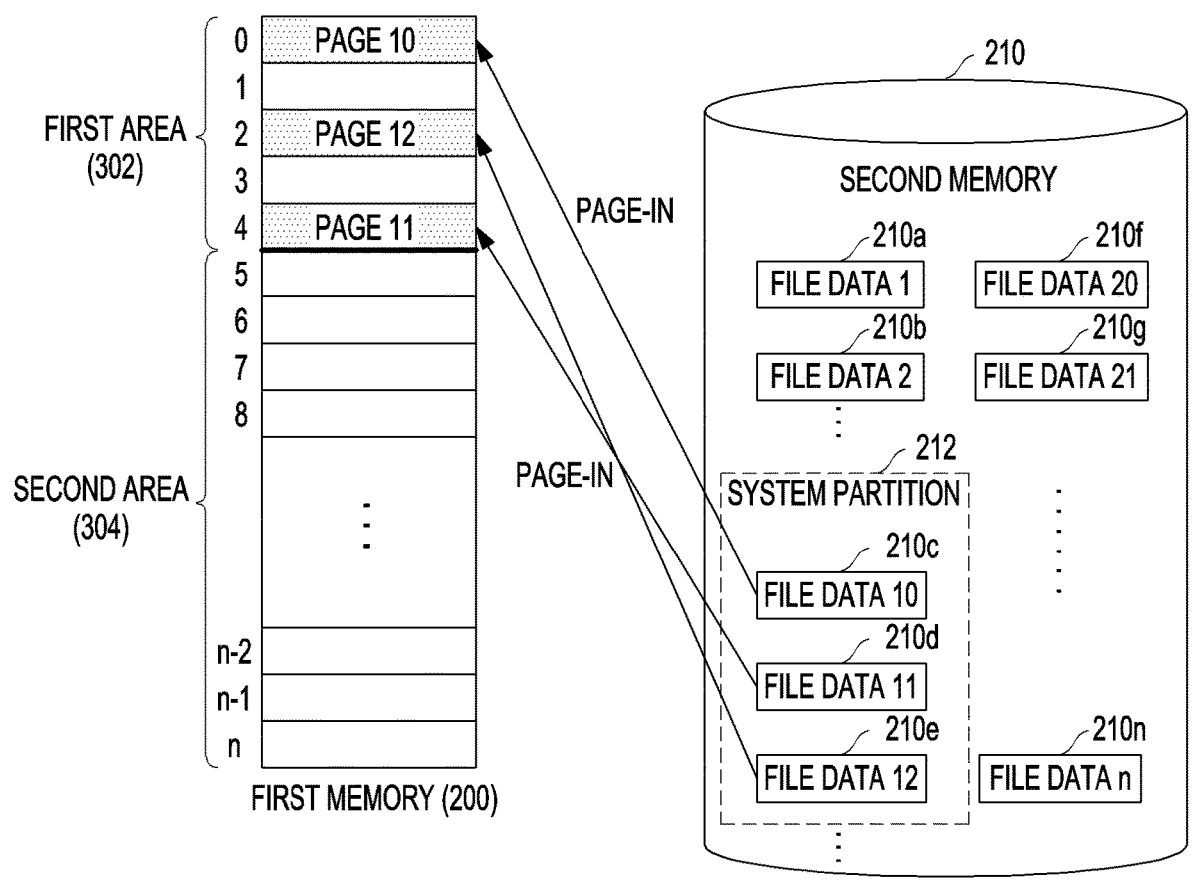
FIGS. 5A, 5B, and 5C are diagrams for describing page-in, according to various embodiments.
Figure 5B:
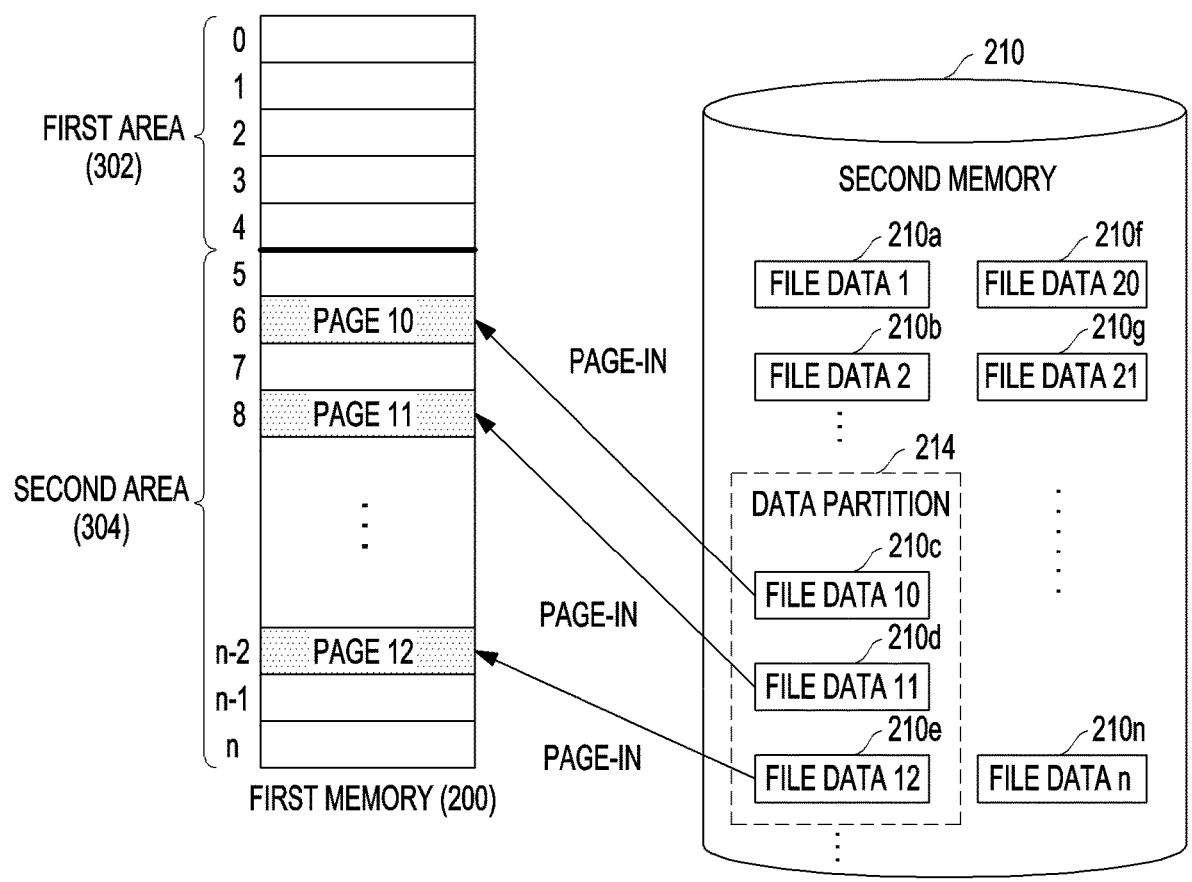
Figure 5C:
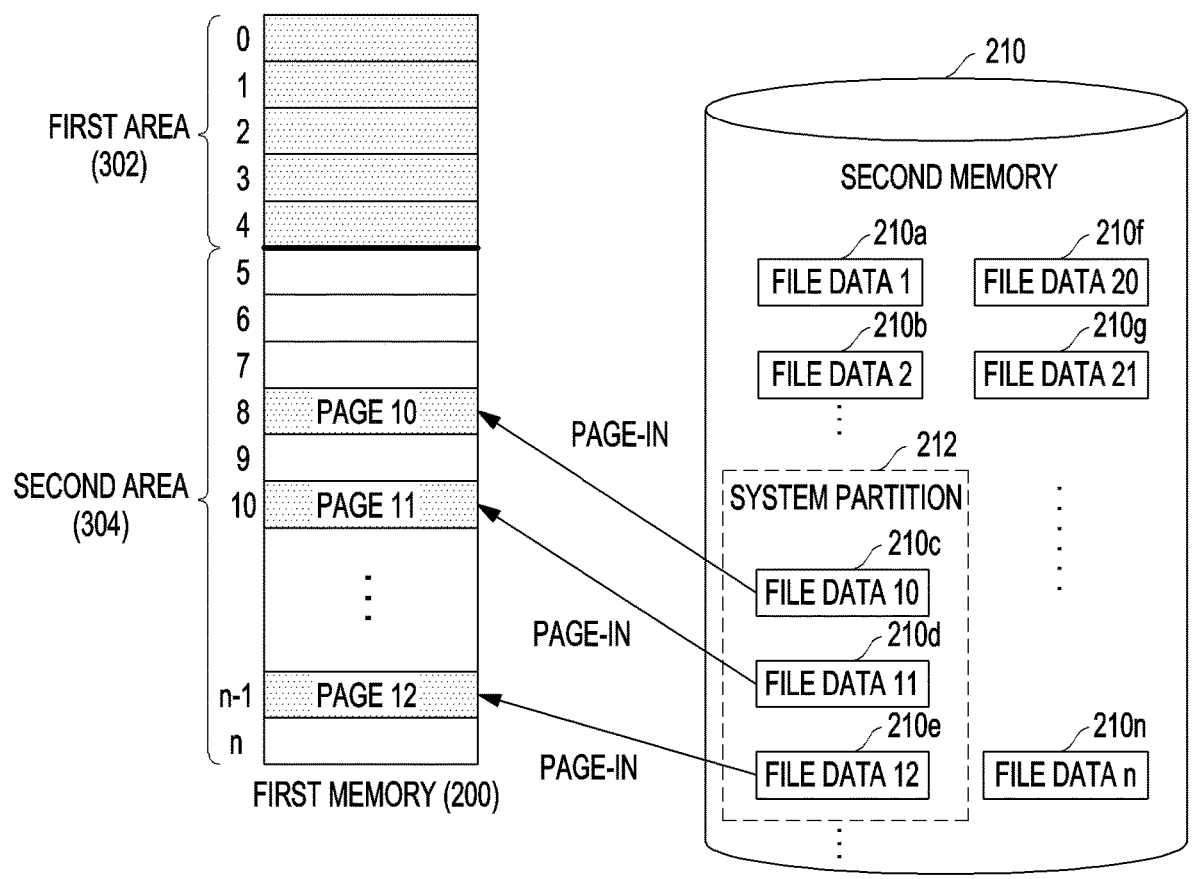

FIGS. 5A, 5B, and 5C are diagrams for describing page-in, according to various embodiments. FIGS. 5A through 5C show a case where a page according to various embodiments of the present disclosure is paged-in in the first area (e.g., the first area 302 of FIG. 3A) and a case where the page is paged-in in the second area (e.g., the second area 304 of FIG. 3A).

Referring to FIG. 5A, in the second memory 210 according to various embodiments of the present disclosure, file data (e.g., file data 1 210a, file data 2 210b, file data 10 210c, file data 11 210d, file data 12 210e, file data 20 210f, file data 21 210g, and file data n 210n, hereinafter mentioned as "file data 1 210a through file data n 210n" for convenience of a description) may be stored. The file data according to various embodiments of the present disclosure may be stored in the unit of a data block. The size of the data block according to various embodiments of the present disclosure may have the same size (e.g., 4 Kb) as the page of the first memory 200. At least some of a plurality of data blocks (a data block 1 201a through a data block n 201n) according to various embodiments of the present disclosure may be stored in a designated partition (e.g., a swap partition (/swap), a system partition (/sys), a data partition (/data), etc.) that is a logically divided area in the second memory 210. According to various embodiments, the term "partition" mentioned in the present disclosure may be mentioned as the term "directory". The processor (e.g., the processor 120 of FIG. 1) according to various embodiments of the present disclosure may access a target page for page-in when occurrence of a page-in trigger event is identified during execution of a certain process. The processor (e.g., the processor 120 of FIG. 1) according to various embodiments of the present disclosure may determine a partition of the second memory 210 in which file data corresponding to the target pages (e.g., the file data 10 210c, the file data 11 210d, and the file data 12 210e) are stored, by using file mapping information (e.g., the file mapping information 322 of FIG. 3B). In FIG. 5A, for example, file data (e.g., the file data 10 210c, the file data 11 210d, and the file data 12 210e) corresponding to target pages (e.g., page 1, page 2, and page 3) are stored in the system partition 212. The processor (e.g., the processor 120 of FIG. 1) according to various embodiments of the present disclosure may store (e.g., page-in) file data (e.g., the file data 10 210c, the file data 11 210d, and the file data 12 210e) corresponding to the target pages in the first area 302, when determining that the file data (e.g., the file data 10 210c, the file data 11210d, and the file data 12 210e) corresponding to the target pages is stored in a designated partition (e.g., the system partition 212). FIG. 5A shows an embodiment where target pages are paged-in in page frame 0, page frame 2, and page frame 4 of the first area among a plurality of page frames (e.g., the page frames 0 through n) included in the first memory 200.

FIG. 5B shows an embodiment where file data (e.g., the file data 10 210c, the file data 11 210d, and the file data 12 210e) corresponding to the target pages are stored in another partition (e.g., a data partition 214) other than the system partition. The processor (e.g., the processor 120 of FIG. 1) according to various embodiments of the present disclosure may determine that the file data corresponding to the target pages (e.g., the file data 10 210c, the file data 11 210d, and the file data 12 210e) is stored in another partition (e.g., a swap partition) other than the system partition. The processor (e.g., the processor 120 of FIG. 1) according to various embodiments of the present disclosure may store (e.g., page-in) the file data corresponding to the target pages (e.g., the file data 10 210c, the file data 11210d, and the file data 12 210e) stored in a partition other than the system partition in the second area 304.

Referring to FIG. 5C, even when determining that file data corresponding to target pages (e.g., the file data 10 210c, the file data 11 210d, and the file data 12 210e) is stored in the system partition, in case of absence of an empty space in the first area 302 (e.g., absence of a free page frame), the processor (e.g., the processor 120 of FIG. 1) may page-in target pages (e.g., the file data 10 210c, the file data 11 210d, and the file data 12 210e) stored in the system partition in the second area 304 (e.g., the page frame 8, the page frame 10, and the page frame n-1).

Figure 6A:
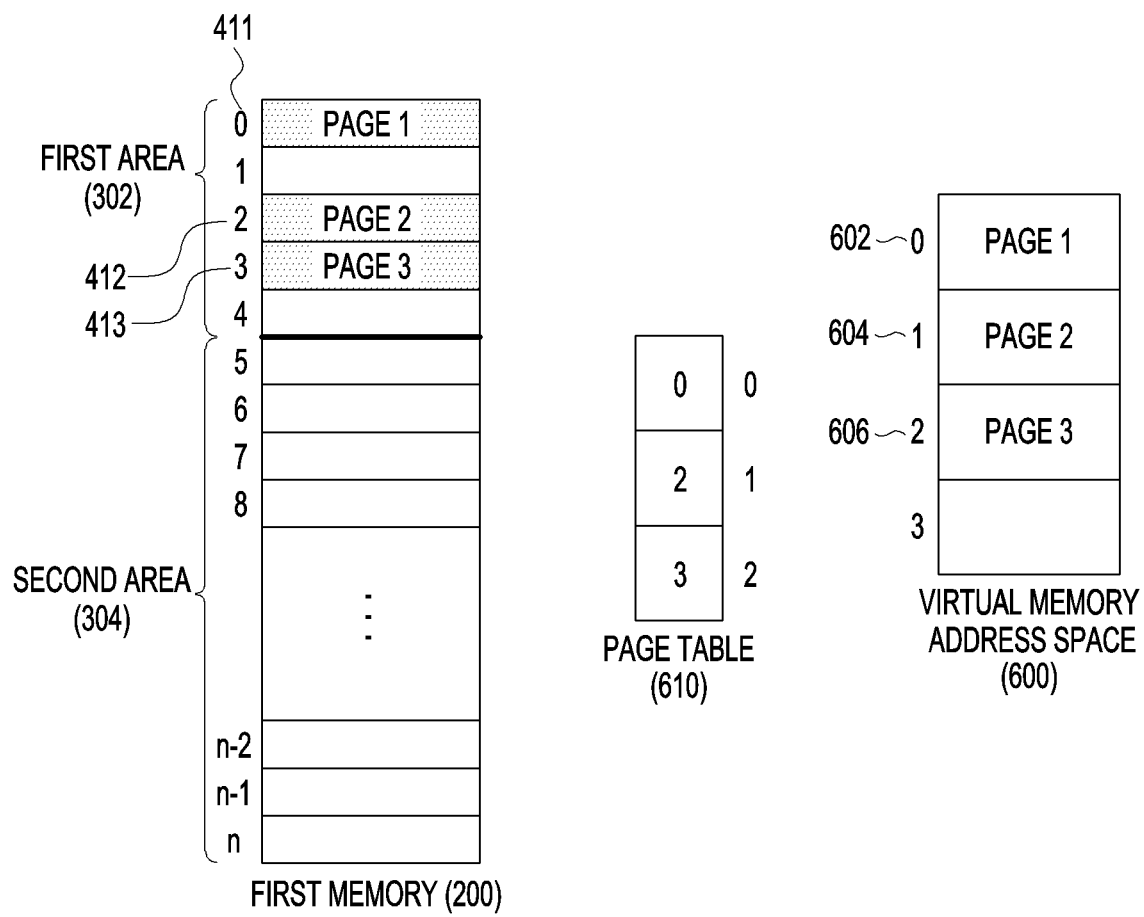
FIGS. 6A and 6B are diagrams for describing an operation of dropping at least one page according to various embodiments.
Figure 6B:
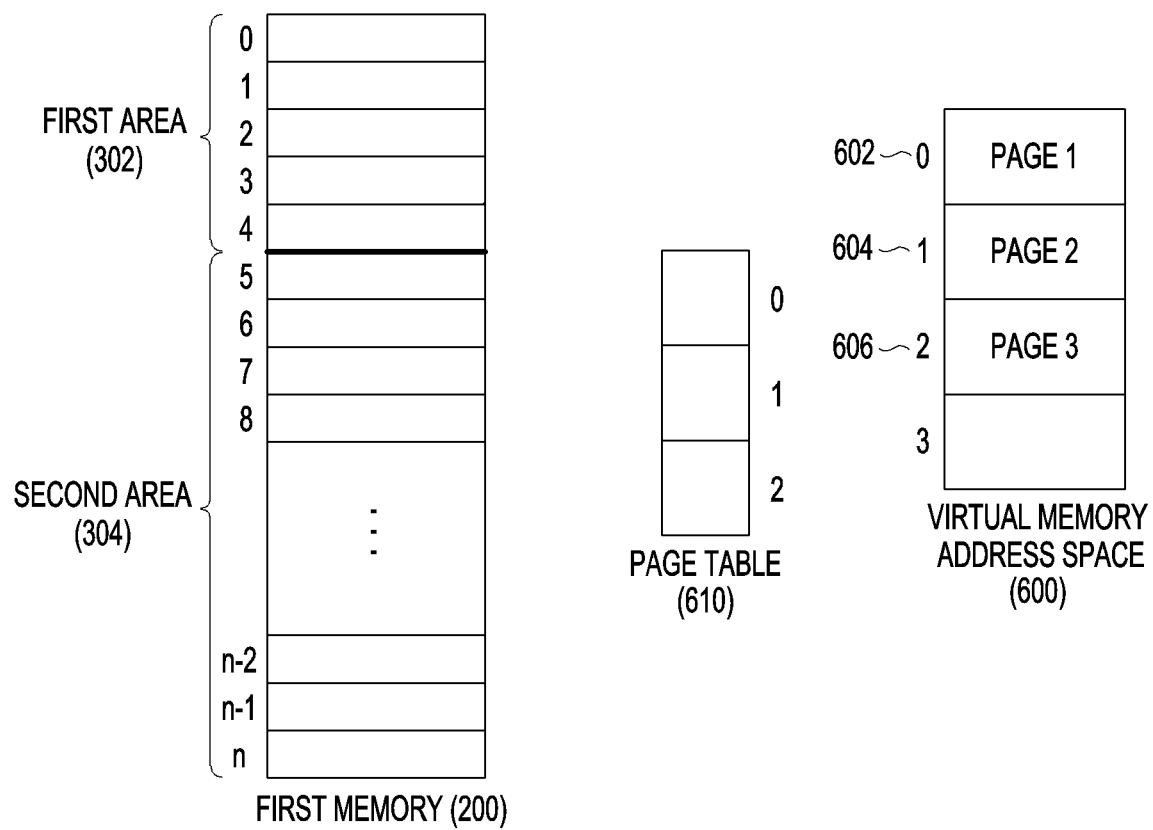

FIGS. 6A and 6B are diagrams for describing an operation of dropping at least one page according to various embodiments.

The processor (e.g., the memory manager 202 of FIG. 2) according to various embodiments of the present disclosure may manage a page table 610 including a mapping relationship between a virtual memory address space 600 and the first memory 200 (e.g., a physical memory). The processor (e.g., the memory manager 202 of FIG. 2) according to various embodiments of the present disclosure may access the first memory 200 by using a page table 610 (e.g., address translation based on an MMU (e.g., the MMU 124 of FIG. 2)). The page table 610 according to various embodiments of the present disclosure may include a mapping relationship between a physical page frame address of a physical memory (e.g., the first memory 200) and a page address of the virtual memory address space 600. For example, FIG. 6A shows an embodiment where page frame 0 411 of a physical memory (e.g., the first memory 200) and page 0 702 of the virtual memory address space 600 are mapped to each other, page frame 2 412 of the physical memory (e.g., the first memory 200) and page 1 704 of the virtual memory address space 600 are mapped to each other, and page frame 3 413 of the physical memory (e.g., the first memory 200) and page 2 706 of the virtual memory address space 600 are mapped to each other. Information (herein, mentioned as the term "page table information") included in the page table 610 according to various embodiments of the present disclosure may be provided to the processor (e.g., the MMU 124 of FIG. 2) by the memory manager (e.g., the memory manager 202 of FIG. 2). The processor (e.g., the MMU 124 of FIG. 2) according to various embodiments of the present disclosure may access the physical memory (e.g., the first memory 200) by using the provided page table information. According to various embodiments of the present disclosure, the processor (e.g., the MMU 124 of FIG. 2) may obtain page table information by accessing the page table 610.

The electronic device (e.g., the MMU 124 of FIG. 2) according to various embodiments of the present disclosure may drop pages mapped to the first area 302 by deleting a physical memory (e.g., address information (or page frame information) of the first memory 200) included in page table information (e.g., the memory mapping information 324 of FIG. 3A) as shown in FIG. 6B. In the present disclosure, the term "drop" may mean that the memory manager 202 changes at least one page into an allocable state. In various embodiments, the term "drop" may alternatively/interchangeably with various terms such as "unmap", "page-out", "swap-out", "delete", "clean", "switch to a free page", etc. The processor (e.g., the MMU 124 of FIG. 2) according to various embodiments of the present disclosure may maintain a virtual memory area (VMA) (e.g., page 0 702, page 1 702, and page 2 704) generated for allocation of pages 1 through 3 after page dropping. Upon occurrence of a page-in trigger event for the maintained VMA, the processor (e.g., the processor 120 of FIG. 1) according to various embodiments of the present disclosure may identify the maintained VMA as an invalid memory area. This case may be identified by page fault by the processor (e.g., the processor 120 of FIG. 1) according to various embodiments of the present disclosure. The processor (e.g., the processor 120 of FIG. 1) according to various embodiments of the present disclosure may load (allocate) data corresponding to the page-in trigger event in the first memory 200 (e.g., the physical memory) by page fault.

The processor (e.g., the processor 120 of FIG. 1) according to various embodiments of the present disclosure may skip an operation of identifying a page attribute identifier (e.g., a flag value). For example, for at least one page stored in the first area 302 of the first memory 200, details of the changed page may be updated in a scheme (e.g., migration or the backing store (e.g., the second memory 210 of FIG. 5A)) of dropping (e.g., a used page is withdrawn as a free page), or the operation of identifying a page attribute identifier for determining to maintain the page on the first memory 200 in spite of a drop request of the processor (e.g., the processor 120 of FIG. 1) may be skipped and the at least one page may be dropped from the first area 302. For example, a page having a read attribute is stored in the first area 302 according to various embodiments of the present disclosure, such that an operation of determining whether the page stored in the first area 302 is a certain page (e.g., an anonymous page, a pin page, a dirty page of a page cache, etc.) other than a page having the read attribute. When the operation of identifying the page attribute identifier (e.g., the flag value) is skipped, dropping of the at least one page allocated to the first area 302 may be rapidly performed. However, according to various embodiments of the present disclosure, an operation of identifying an identifier for the at least one page allocated to the first area 302 may be performed.

According to various embodiments of the present disclosure, when withdrawing a memory page allocated to the second area (e.g., the second area 304 of FIG. 3A) of the first memory (e.g., the first memory 200 of FIG. 3A), the electronic device (e.g., the memory manager 202 of FIG. 2) may use various page drop schemes (e.g., migration of at least one page to be dropped to another free page in the memory area (e.g., the second area 304 of FIG. 3A), updating of information about the at least one page to be dropped to the backing store, various withdrawal schemes for a clean page and a dirty page of a page cache, etc.) according to attributes of each page allocated to the second area (e.g., the second area 304 of FIG. 3A), and may drop (e.g., withdraw) the memory page allocated to the first area (e.g., the first area 302 of FIG. 3A) in a consistent (e.g., certain) manner (e.g., a scheme to withdraw the clean page (e.g., delete the clean page from the first area 302 of FIG. 3A)) when withdrawing the memory page allocated to the first area (e.g., the first area 302 of FIG. 3A).

However, the processor (e.g., the MMU 124 of FIG. 2) according to various embodiments of the present disclosure may delete a VMA (e.g., page 0 702, page 1 702, and page 2 704) generated for allocation of pages 1 through 3 after page dropping. In the present disclosure, the term "page-in" may be mentioned as the term for representing an operation or process of being allocated with a page and loading data from the second memory (e.g., the second memory 210 of FIG. 5A) to the first memory (e.g., the first memory 200 of FIG. 2A).

Figure 6C:
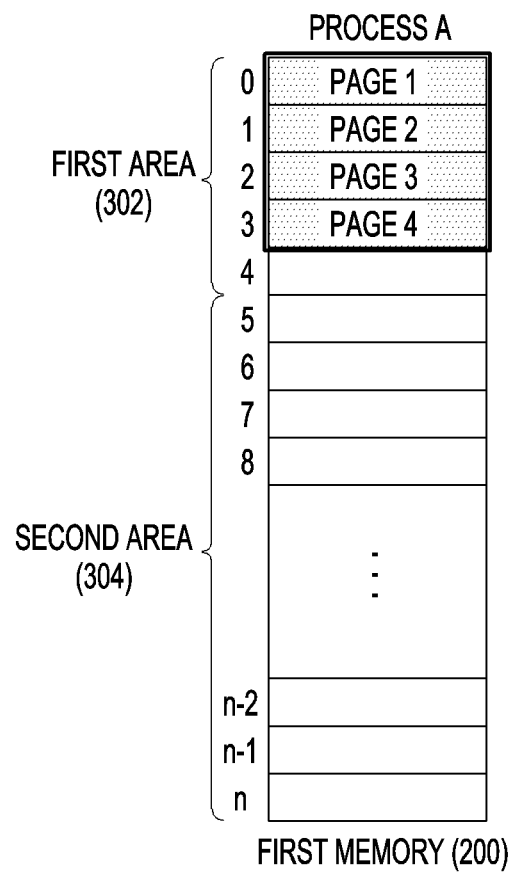
FIG. 6C is a diagram for describing an operation after at least one page is dropped, according to various embodiments.

FIG. 6C is a diagram for describing an operation after at least one page is dropped, according to various embodiments. In FIG. 6C, an operation of allocating pages for execution of a certain process to the first area 302 after dropping of at least one page will be described.

The processor (e.g., the processor 120 of FIG. 1) according to various embodiments of the present disclosure may allocate at least one page (e.g., page 1, page 2, page 3, and page 4) for a certain process (e.g., process A) to the first area 302 from which the at least one page is dropped. According to various embodiments of the present disclosure, rapid memory allocation for a large-size process may be performed.

Figure 6D:
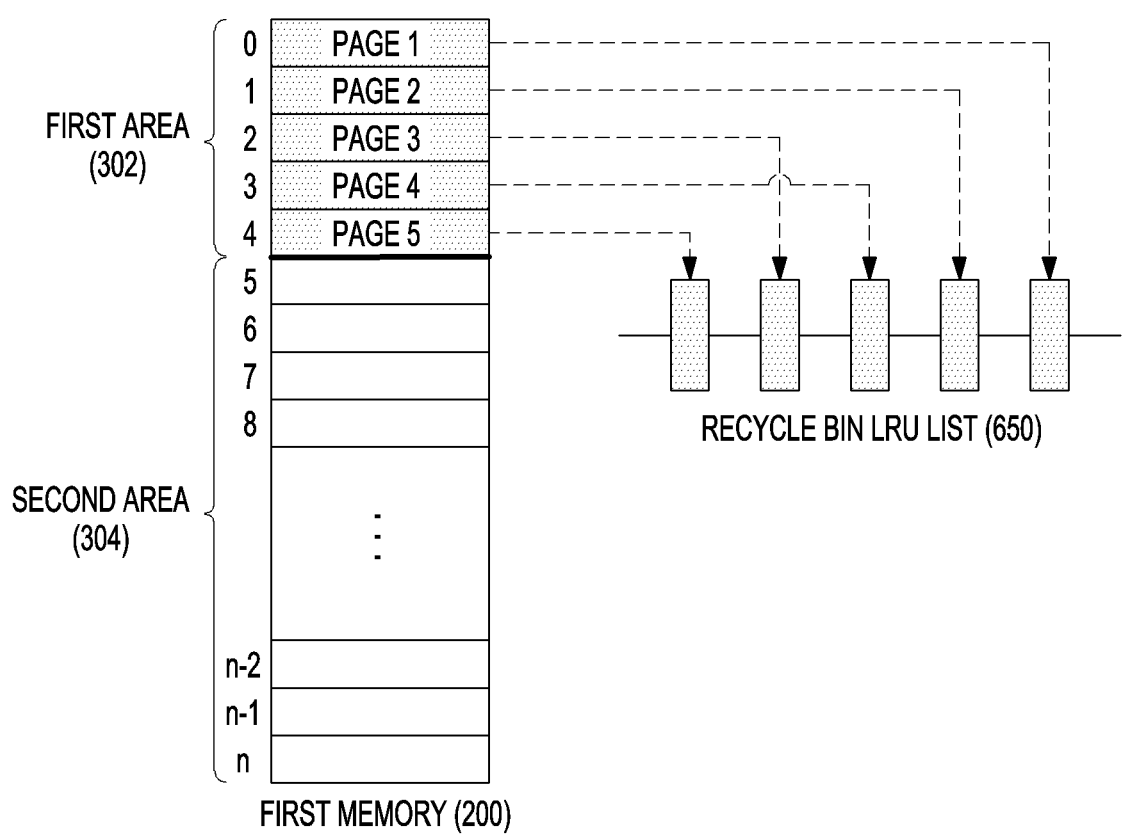
FIG. 6D is a diagram for describing least recently used (LRU) information for at least one dropped page, according to various embodiments.

FIG. 6D is a diagram for describing LRU information (e.g., the recycle bin LRU information 325 of FIG. 3A) for at least one dropped page, according to various embodiments.

The processor (e.g., the processor 120 of FIG. 1) according to various embodiments of the present disclosure may generate an LRU list for pages allocated to the first area 302 as shown in FIG. 6D. In FIG. 6D, the recycle bin LRU list 650 (or a recycle bin LRU vector list) is illustrated for example. In the present disclosure, an LRU list for dropped pages may be mentioned as the term "recycle bin LRU list". The processor (e.g., the processor 120 of FIG. 1) according to various embodiments of the present disclosure may generate the recycle bin LRU list 650 based on use frequency priorities among a past few instructions from the current time (e.g., a time at which the recycle bin LRU list 650 is generated). FIG. 6D illustrates an embodiment where the recycle bin LRU list 650 having priorities of page 1, page 2, page 4, page 3, and page 5 in that order based on a use frequency of a page. The recycle bin LRU information 650 according to various embodiments of the present disclosure may be managed by the memory manager (e.g., the memory manager 202 of FIG. 2). The processor (e.g., the processor 120 of FIG. 1) according to various embodiments of the present disclosure may access the recycle bin LRU list 650 by using the memory manager (e.g., the memory manager 202 of FIG. 2). The recycle bin LRU list 650 according to various embodiments of the present disclosure may have an attribute of an active LRU list (e.g., an LRU list in which recently accessed pages are sequentially arranged).

Figure 7:
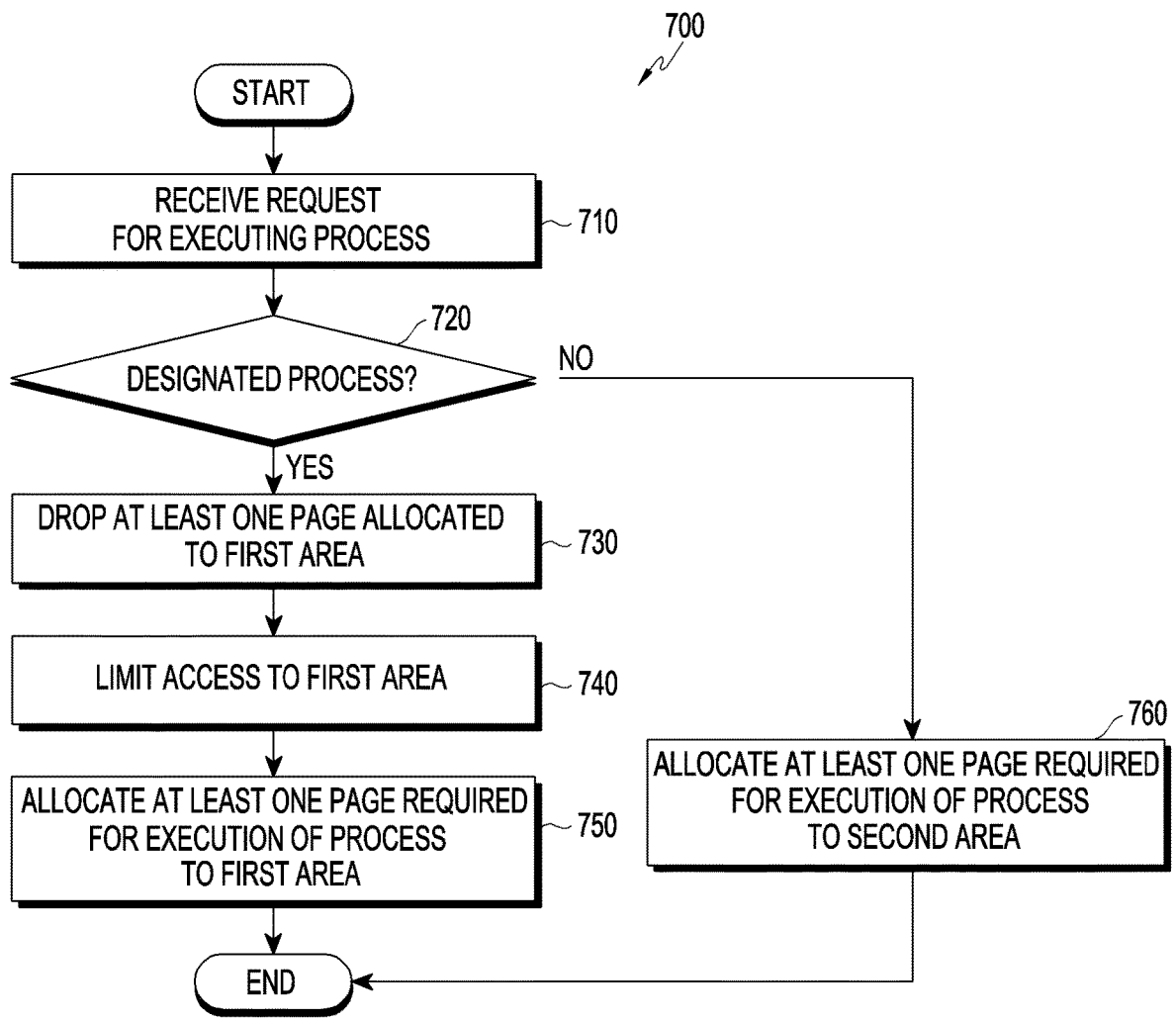
FIGS. 7, 8, 9A, 9B, 10, and 11 are flowcharts for describing an operating method of an electronic device, according to various embodiments.

FIG. 7 is a flowchart 700 for describing an operating method of an electronic device (e.g., the electronic device 101 of FIG. 1) according to various embodiments. In FIG. 7, an operation of allocating at least one page related to execution of a process in execution of the process is illustrated.

Referring to FIG. 7, in operation 710, the electronic device (e.g., the processor 120 of FIG. 1) according to various embodiments of the present disclosure may receive a request for executing the process. The request for executing the process according to various embodiments of the present disclosure may include, for example, a process execution request based on a user input for executing a certain application (e.g., the camera application or the security application). However, this is merely described as an example to describe various embodiments of the present disclosure, such that the request for executing the process according to various embodiments of the present disclosure may include a request transmitted to the processor (e.g., the processor 101 of FIG. 1) from a kernel (or various hardware/software components) to execute the certain process.

In operation 720, the electronic device 101 (e.g., the processor 120) may determine whether the executed process is a designated process. According to various embodiments of the present disclosure, whether the process for which execution is requested is the designated process may include an operation, performed by the processor (e.g., the processor 120 of FIG. 1), of determining whether the process for which execution is requested is a large-size process. According to various embodiments of the present disclosure, the processor (e.g., the manager 202 of FIG. 2) may be requested to allocate a memory of a certain size (e.g., 500 megabytes) on the first memory (e.g., the first memory 200 of FIG. 2) according to the process execution request.

According to various embodiments of the present disclosure, when the size of the memory required for the process execution request is greater than a designated threshold value (e.g., 200 megabytes), the processor (e.g., the memory manager 202 of FIG. 2) may determine that the process is the designated process. According to various embodiments of the present disclosure, whether the process for which execution is requested is the designated process may include an operation, performed by the processor (e.g., the processor 120 of FIG. 1), of determining whether the process for which execution is requested is a pre-designated process (e.g., the camera application, a game application, etc.).

When determining that the execution-requested process is the large-size process (yes in operation 720), the processor (e.g., the processor 120 of FIG. 1) may drop at least one page allocated to the first area (e.g., the first area 302 of FIG. 4A) in operation 730.

In operation 740, the processor (e.g., the processor 120 of FIG. 1) may perform access limit processing with respect to the first area (e.g., the first area 302 of FIG. 4A). The access limit processing according to various embodiments of the present disclosure may include an operation of setting the first area (e.g., the first area 302 of FIG. 4A) to a full state. Through the access limit processing according to various embodiments of the present disclosure, at least one page may not be paged-in in the first area 302. According to various embodiments, operation 740 may be omitted.

In operation 750, the processor (e.g., the processor 120 of FIG. 1) may allocate at least one page required for execution of the process to the first area (e.g., the first area 302 of FIG. 4A).

When determining that the execution-requested process is a normal process (no in operation 720), the processor (e.g., the processor 120 of FIG. 1) may allocate at least one page required for execution of the process to the second area (e.g., the second area 304 of FIG. 4A) in operation 760.

The operating method of the electronic device according to various embodiments of the present disclosure, controlled by the processor (e.g., the processor 120 of FIG. 1) and described in relation to FIG. 7, may be understood as operations performed by a kernel (e.g., the memory manager) under control of the processor, depending on embodiments of the present disclosure.

Figure 8:
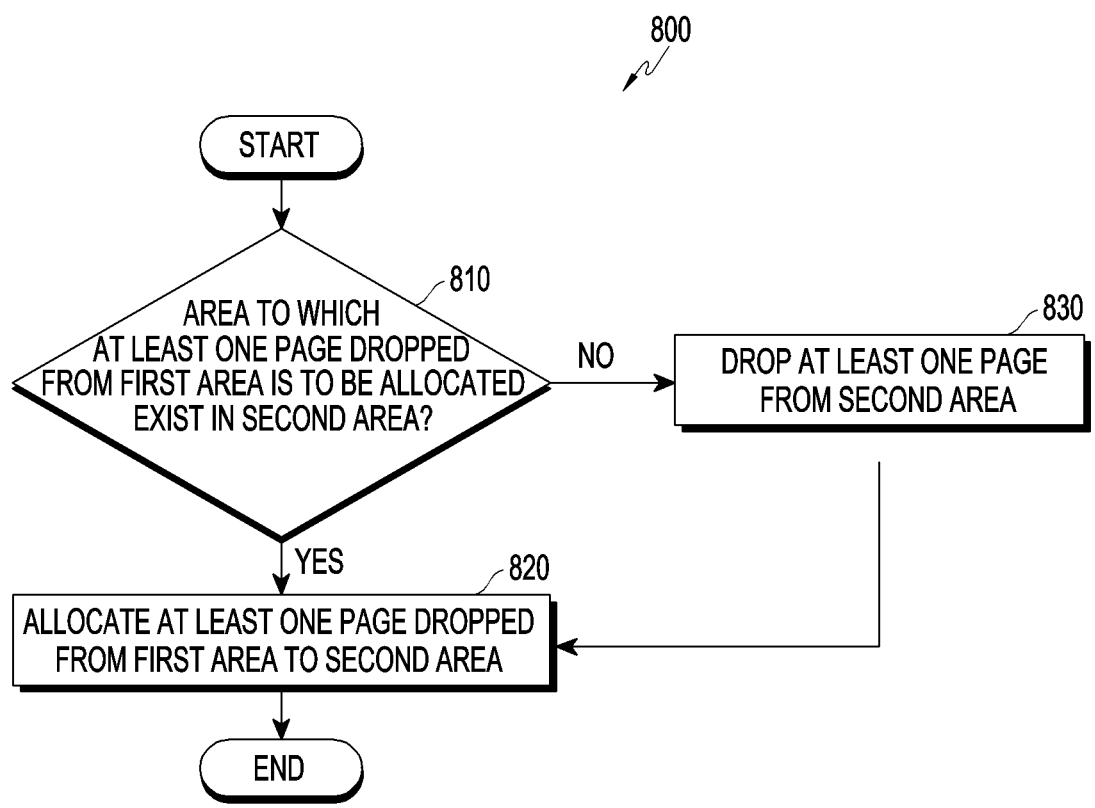

FIG. 8 is a flowchart 800 for describing an operating method of an electronic device (e.g., the electronic device 101 of FIG. 1) according to various embodiments. FIG. 8 is a flowchart for describing an operation of at least temporarily allocating (e.g., paging-in) at least one page dropped from a first area (e.g., the first area 202 of FIG. 2A) of the first memory (e.g., the first memory 200 of FIG. 2A) to the second area (e.g., the second area 204 of FIG. 2A) to reconstruct the at least one page. Operations 810 through 830 may be performed according to a request transmitted from a kernel (or various hardware/software components) to the processor (e.g., the processor 101 of FIG. 1) to execute a certain process.

Referring to FIG. 8, in operation 810, the processor (e.g., the processor 120 of FIG. 1) may determine whether there is an area in the second area (e.g., the second area 304 of FIG. 6A) to which at least one page dropped from the first area (e.g., the first area 302 of FIG. 3A) is allocated. Operation 810 according to various embodiments of the present disclosure may be understood as an operation of determining whether a size of the memory (e.g., the first memory 200 of FIG. 6A) to which at least one page dropped from the first area (e.g., the first area 302 of FIG. 3A) is at least temporarily allocated (e.g., stored) may be secured.

When an area to which the dropped at least one page is to be dropped exists in the second area (yes in operation 810), the processor (e.g., the processor 120 of FIG. 1) may allocate at least one page dropped from the first area (e.g., the first area 302 of FIG. 3A) to the second area (e.g., the second area 304 of FIG. 6A) by using the recycle bin LRU information (e.g., the recycle bin LRU list 650 of FIG. 6D).

When an area to which the dropped at least one page is to be dropped is not present in the second area (no in operation 810), the processor (e.g., the processor 120 of FIG. 1) may drop the at least one page from the second area (e.g., the second area 304 of FIG. 6A) based on the inactive LRU list, in operation 830. The inactive LRU list according to various embodiments of the present disclosure may include an inactive LRU list for the second area (e.g., the second area 304 of FIG. 6A). According to various embodiments of the present disclosure, an inactive LRU list (e.g., an LRU list where pages that are not accessed recently are sequentially arranged) in which the first area (e.g., the first area 302 of FIG. 3A) and the second area (e.g., the second area 304 of FIG. 6A) are integrated (e.g., not separated) may be included. The processor (e.g., the processor 120 of FIG. 1) according to various embodiments of the present disclosure may allocate the dropped at least one page to the second area (e.g., the second area 304 of FIG. 6A) based on the recycle bin LRU information in operation 810, after operation 830. According to various embodiments of the present disclosure, in operation 820, the at least one page dropped from the first area (e.g., the first area 302 of FIG. 3A) may be at least temporarily allocated to the second area (e.g., the second area 304 of FIG. 6A).

According to various embodiments, the processor (e.g., the processor 120 of FIG. 1) may allocate (e.g., reconstruct) the at least one page dropped from the first area (e.g., the first area 302 of FIG. 3A) to the second area (e.g., the second area 304 of FIG. 3A) by using the recycle bin LRU information (e.g., the recycle bin LRU list 650 of FIG. 6D). Such a page reconstruction operation may be executed in a background during execution of a designated process requesting dropping of data allocated to the first area (e.g., the first area 302 of FIG. 3A). According to various embodiments of the present disclosure, a process of allocating the at least one page dropped from the first area (e.g., the first area 302 of FIG. 3A) to the second area (e.g., the second area 304 of FIG. 4A) may be executed by a thread that is irrelevant to at least one application (e.g., a designated process requesting dropping of data allocated to the first area (e.g., the first area 302 of FIG. 3A)) being executed in the current electronic device (e.g., the electronic device 101 of FIG. 1).

Figure 9A:
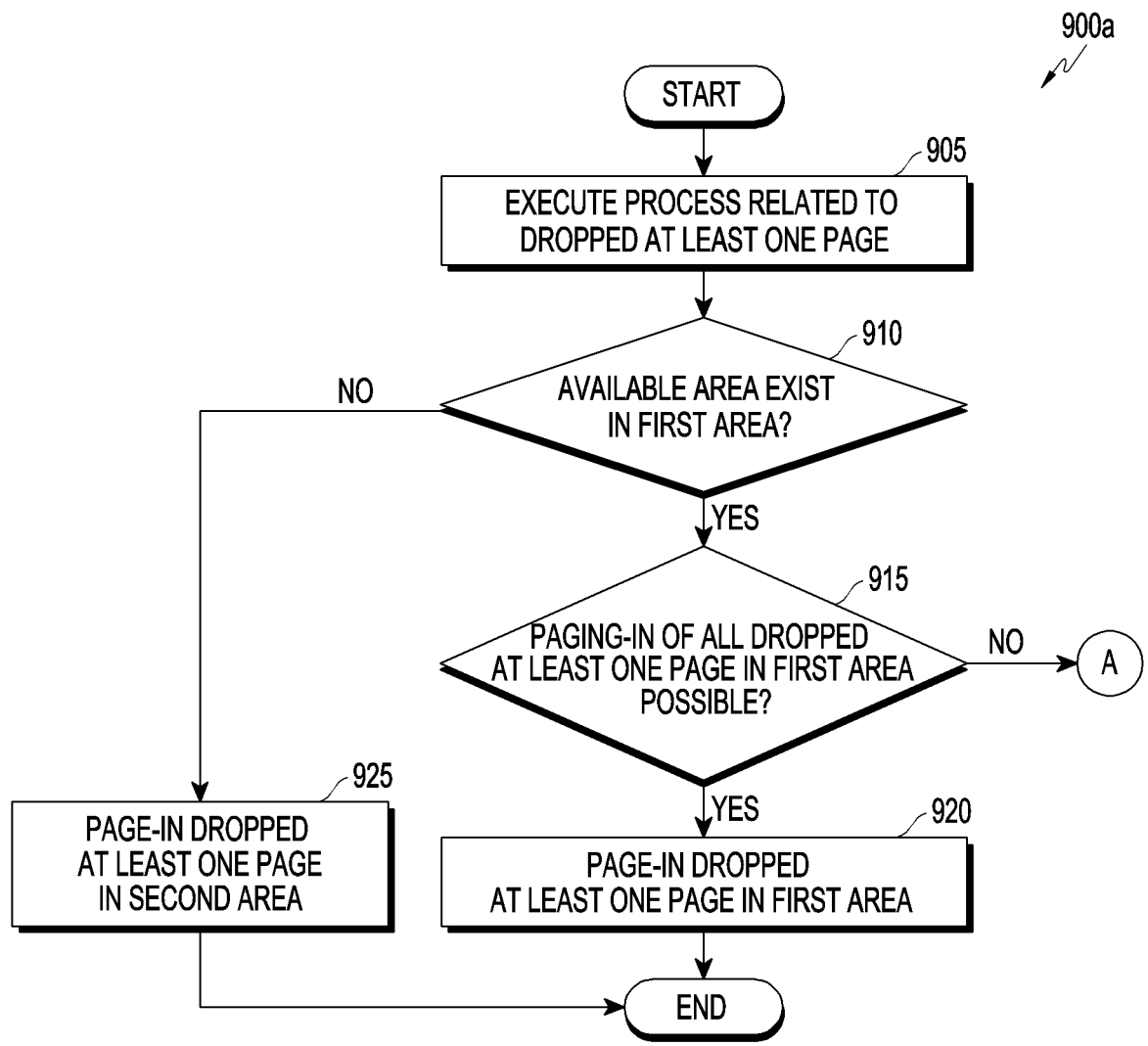
Figure 9B:
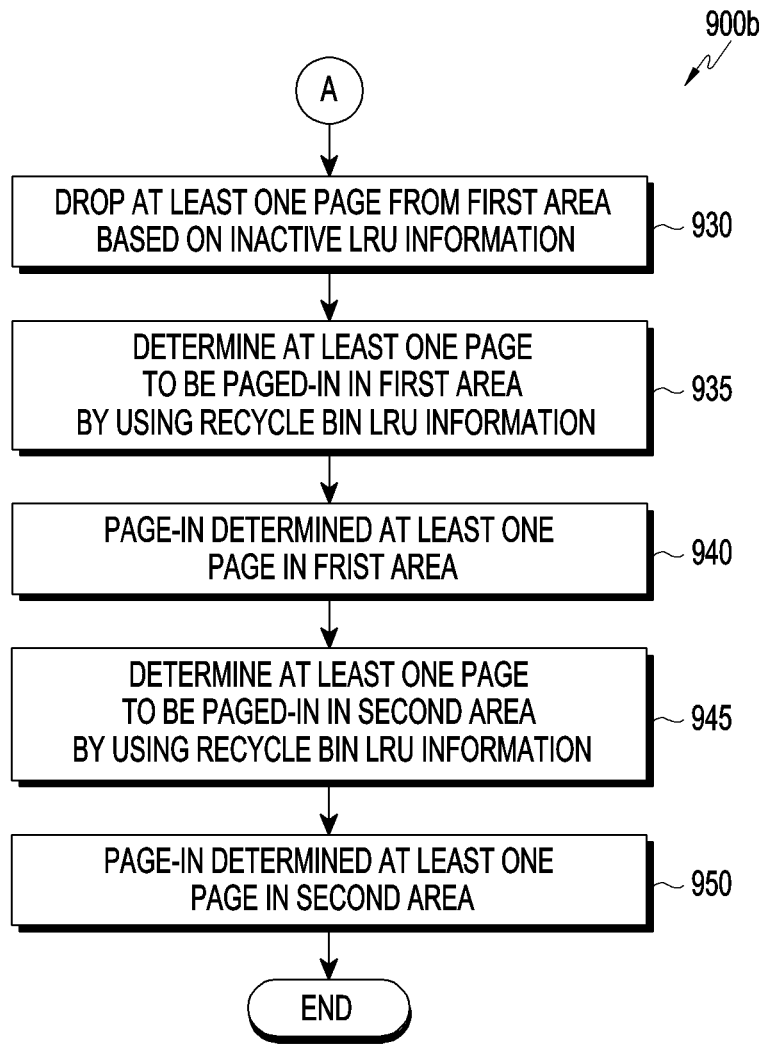

FIGS. 9A and 9B are flowcharts 900a and 900b for describing an operating method of an electronic device, according to various embodiments. In FIG. 9A, an operation of re-paging-in dropped at least one page is described as an example.

According to various embodiments of the present disclosure, after pages mapped to the first area (e.g., the first area 302 of FIG. 4A) are dropped in response to a memory allocation request corresponding to execution of a designated application (e.g., the camera application), an execution request of a process related to pages dropped within a designated time (e.g., 10 seconds) may be received (e.g., after execution of the camera application, a return request to the home screen may be received from the user or an execution request of another application is received). In relation to FIGS. 9A and 9B, an embodiment is described in which pages dropped from the first area (e.g., the first area 302 of FIG. 4A) are re-allocated to the first area (e.g., the first area 302 and/or the second area 304 of FIG. 4A) by using the file mapping information (e.g., the file mapping information 322 of FIG. 3B) and the recycle bin LRU information (e.g., the recycle bin LRU information 326 of FIG. 4B), thereby preventing a time delay from occurring due to re-allocation. The operating method of the electronic device according to various embodiments of the present disclosure, controlled by the processor (e.g., the processor 120 of FIG. 1) and described in relation to FIGS. 9A and 9B, may be understood as operations performed by a kernel under control of the processor, depending on embodiments of the present disclosure.

Referring to FIG. 9A, in operation 905, the processor (e.g., the processor 120 of FIG. 1) may execute the process related to the dropped at least one page. Operation 905 according to various embodiments of the present disclosure may be performed in response to a request transmitted to the processor (e.g., the processor 101 of FIG. 1) from a kernel (or various hardware/software components) to execute the certain process.

In operation 910, the processor (e.g., the processor 120 of FIG. 1) may determine whether an available area exists in the first area (e.g., the first area 302 of FIG. 3A).

In operation 915, the electronic device (e.g., the processor 120 of FIG. 1) may determine whether the dropped at least one page may be paged-in (or cached) in the first area (e.g., the first area 302 of FIG. 3A). Operation 915 according to various embodiments of the present disclosure may include an operation, performed by the electronic device (e.g., the processor 120 of FIG. 1) of determining whether there is a free-page frame of a size in which the dropped at least one page is paged-in.

When determining in operation 915 that paging-in of the dropped at least one page in the first area (e.g., the first area 302 of FIG. 3A) is possible (e.g., paging-in of all the dropped at least one page is possible) (yes), the processor (e.g., the processor 120 of FIG. 1) may page-in the dropped at least one page in the first area (e.g., the first area 302 of FIG. 3A) in operation 920.

When determining in operation 910 that an available area does not exist in the first area (e.g., the first area 302 of FIG. 3A), the processor (e.g., the processor 120 of FIG. 1) may page-in the dropped at least one page in the second area (e.g., the second area 304 of FIG. 3B) in operation 920.

According to various embodiments of the present disclosure, in operation 915, the electronic device (e.g., the electronic device 101 of FIG. 1) may determine whether some of the dropped at least one page (e.g., a plurality of pages) may be paged-in in the first area (e.g., the first area 302 of FIG. 3A) (no in operation 915). FIG. 9B shows operations after it is determined in operation 915 that some of the plurality of dropped pages may be paged-in in the first area (e.g., the first area 302 of FIG. 3A) (e.g., there is an area where some pages may be paged-in).

Referring to FIG. 9B, in operation 930, the processor (e.g., the processor 120 of FIG. 1) may drop at least one page from the first area (e.g., the first area 302 of FIG. 3A), based on an inactive LRU list. The inactive LRU list according to various embodiments of the present disclosure may mean an LRU list for a page not accessed by a certain process (or a processor (e.g., the processor 120 of FIG. 1)) during a designated time. According to various embodiments of the present disclosure, in operation 930, the processor (e.g., the processor 120 of FIG. 1) may sequentially drop at least one page from the first area (e.g., the first area 302 of FIG. 3A) to secure an area in which the dropped page may be paged-in, in an order of the highest priority for the inactive LRU list, for example, in an order of the lowest use frequency (or the longest access time of the process (or the processor) for the page) among a past few instructions. According to various embodiments of the present disclosure, in operation 930, a memory area in which the dropped at least one page may be paged-in may be secured.

In operation 935, the processor (e.g., the processor 120 of FIG. 1) may determine at least one page (or file data) to be paged-in in the first area (e.g., the first area 302 of FIG. 3A), by using recycle bin LRU information (e.g., the recycle bin LRU information 326 of FIG. 3B). The electronic device (e.g., the processor 120 of FIG. 1) according to various embodiments of the present disclosure may determine at least one page (or file data) to be paged-in in the first area (e.g., the first area 302 of FIG. 3A) in an order of the latest process-accessed order from the current time.

In operation 940, the processor (e.g., the processor 120 of FIG. 1) may page-in the at least one page determined in operation 935 in the first area (e.g., the first area 302 of FIG. 3A). The electronic device (e.g., the processor 120 of FIG. 1) according to various embodiments of the present disclosure may access file data corresponding to the at least one page determined in operation 935. The electronic device (e.g., the processor 120 of FIG. 1) according to various embodiments of the present disclosure may load (e.g., page-in) the accessed file data in the first area (e.g., the first area 302 of FIG. 3A) of the first memory (e.g., the first memory 200 of FIG. 2).

In operation 945, the processor (e.g., the processor 120 of FIG. 1) may determine at least one page (or file data) to be paged-in in the second area (e.g., the second area 304 of FIG. 3A), by using recycle bin LRU information (e.g., the recycle bin LRU information 326 of FIG. 3B). The electronic device (e.g., the processor 120 of FIG. 1) according to various embodiments of the present disclosure may determine the other page/pages than the at least one page determined in operation 935 as at least one page to be paged-in in the second area (e.g., the second area 304 of FIG. 2) among pages included in the recycle bin LRU information (e.g., the recycle bin LRU information 326 of FIG. 3B).

In operation 950, the processor (e.g., the processor 120 of FIG. 1) may page-in the at least one page determined in operation 945 in the second area (e.g., the second area 304 of FIG. 3A). The electronic device (e.g., the processor 120 of FIG. 1) according to various embodiments of the present disclosure may access file data corresponding to the other page/pages determined in operation 945. The electronic device (e.g., the processor 120 of FIG. 1) according to various embodiments of the present disclosure may load (e.g., page-in) the accessed file data in the second area (e.g., the second area 304 of FIG. 3A) of the first memory (e.g., the first memory 200 of FIG. 2).

The processor (e.g., the processor 120 of FIG. 1) according to various embodiments of the present disclosure may execute (or load) a process related to the dropped at least one page in a background, when determining that at least a partial area of the first memory (e.g., the first area (e.g., the first area 302 of FIG. 3A) of the first memory 200 of FIG. 2) is currently used.

Figure 10:
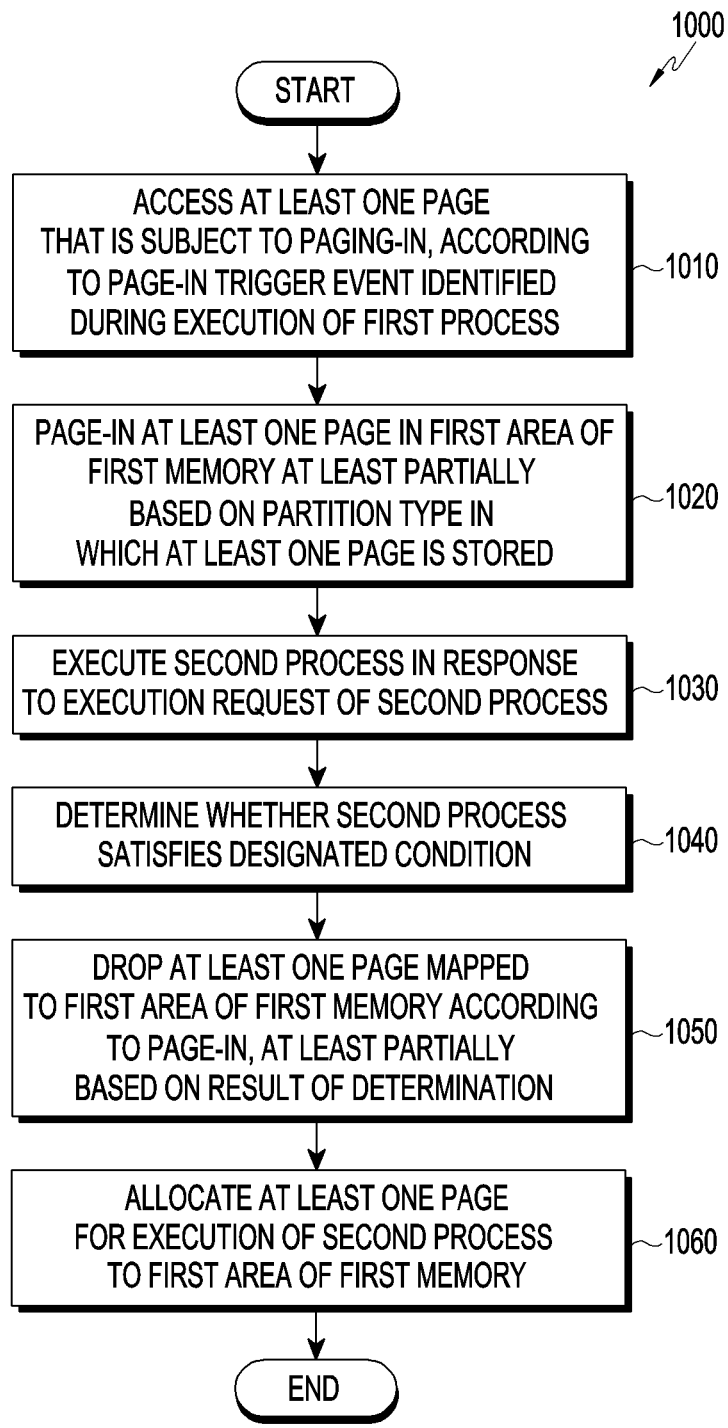
Figure 11:
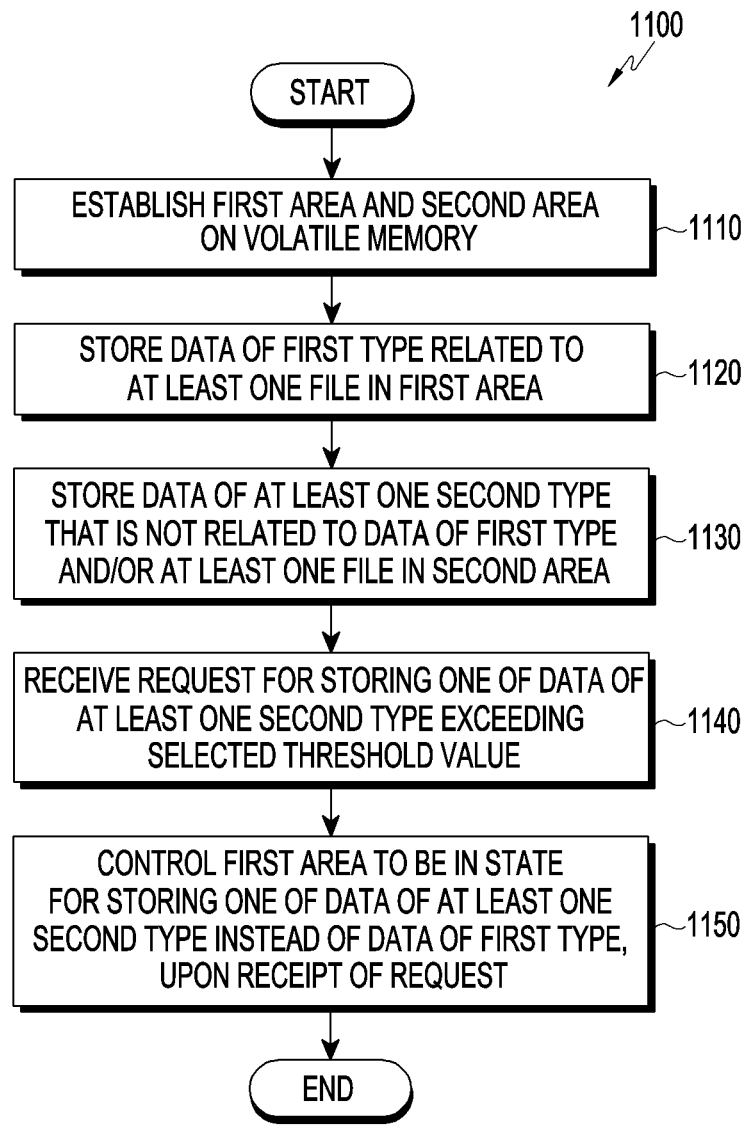

FIGS. 10 and 11 are flowcharts 1000 and 1100 for describing an operation of controlling an electronic device, according to various embodiments.

Referring to FIG. 10, an operating method of the electronic device (e.g., the electronic device 101 of FIG. 1) according to various embodiments of the present disclosure may include operation 1010, performed by the electronic device (e.g., the processor 120 of FIG. 1), of accessing at least one page stored in the second memory, which is subject to paging-in, according to a page-in trigger event identified during execution of a first process.

The operating method of the electronic device (e.g., the electronic device 101 of FIG. 1) according to various embodiments of the present disclosure may include operation 1020, performed by the electronic device (e.g., the processor 120 of FIG. 1), of paging-in the at least one page in the first area at least partially based on a partition type of the second memory in which the at least one page is stored.

In operation 1030, the electronic device (e.g., the processor 120) may execute a second process in response to an execution request for the second process.

In operation 1040, the electronic device (e.g., the processor 120) may determine whether the second process satisfies a designated condition.

In operation 1050, the electronic device (e.g., the processor 120) may drop the at least one page mapped to the first area from the memory according to page-in, at least partially based on a result of the determination of operation 1040.

In operation 1060, the electronic device (e.g., the processor 120) may allocate the at least one page required for execution of the second process to the first area.

Referring to FIG. 11, in operation 1110, the processor (e.g., the processor 120 of FIG. 1) may establish the first area (e.g., the first area 302 of FIG. 3A) and the second area (e.g., the second area 304 of FIG. 3A) on a volatile memory (e.g., the first memory 200 of FIG. 3A).

In operation 1120, the processor (e.g., the processor 120 of FIG. 1) may store data of a first type (e.g., a page having a read attribute) related to at least one file in the first area.

In operation 1130, the processor (e.g., the processor 120 of FIG. 1) may store data of at least one second type (e.g., an anonymous page, etc.) that is not related to the data of the first type and/or at least one file, in the second area.

In operation 1140, the processor (e.g., the processor 120 of FIG. 1) may receive a request for storing one of the data of the at least one second type, which exceeds a selected threshold value (e.g., a threshold size).

In operation 1150, the processor (e.g., the processor 120 of FIG. 1) may control the first area to be in a state for storing one of the data of the at least one second type instead of the data of the first type, upon receipt of the request.

An electronic device (e.g., the electronic device 101 of FIG. 1) according to various embodiments of the present disclosure may include a first memory (e.g., the first memory 200 of FIG. 3A), a second memory (e.g., the second memory 210 of FIG. 5A), and a processor (e.g., the processor 120 of FIG. 1) operatively connected to the first memory and the second memory, in which the processor is configured to access at least one page stored in the second memory, the at least one page being subject to paging-in, in response to a page-in trigger event identified during execution of a first process, to page-in the at least one page in a first area (e.g., the first area 302 of FIG. 3A) of the first memory at least partially based on a partition type in which the at least one page is stored, to execute a second process in response to an execution request of the second process, to determine whether the second process satisfies a designated condition, to drop the at least one page mapped to the first area from the memory according to the page-in, at least partially based on a result of the determination, and to allocate at least one page required for execution of the second process to the first area.

According to various embodiments of the present disclosure, the process satisfying the designated condition may include at least one of a process in which a sum of sizes of pages required for execution of the process exceeds a designated size or a process instructing the processor to use the first area.

According to various embodiments of the present disclosure, the processor may be configured to drop the at least one page mapped to the first area, when the second process satisfies the designated condition.

According to various embodiments of the present disclosure, the processor may be configured to generate a least recently used (LRU) list for the dropped at least one page and temporarily store the generated LRU list in a second area of the first memory.

According to various embodiments of the present disclosure, the processor may be configured to determine whether an available area exists in the first area, when the page-in trigger event for the dropped at least one page is identified.

According to various embodiments of the present disclosure, the processor may be configured to determine whether paging-in of all the dropped at least one page in the first area is possible and to page-in the dropped at least one page in the first area, when paging-in of all the dropped at least one page in the first area is possible.

According to various embodiments of the present disclosure, the processor may be configured to determine whether paging-in of all the dropped at least one page in the first area is possible, to evict the at least one page from the first area based on an inactive LRU list, when it is not possible for all the dropped at least one page to be paged-in, and to page-in the dropped at least one page in the first area.

According to various embodiments of the present disclosure, the processor may be configured to limit paging-in of another page in the first area, when the second process satisfies the designated condition.

According to various embodiments of the present disclosure, the processor may be configured to allocate at least one page related to execution of the second process to the first area, when the second process satisfies the designated condition.

According to various embodiments of the present disclosure, the processor may be configured to allocate at least one page related to execution of the second process to a second area included in the memory, when the second process does not satisfy the designated condition.

According to various embodiments of the present disclosure, the partition type may include a system partition type.

An electronic device (e.g., the electronic device 101 of FIG. 1) according to various embodiments of the present disclosure includes a housing, a communication circuit (e.g., the communication module 190 of FIG. 1), at least one processor (e.g., the processor 120 of FIG. 1) operatively connected with the communication circuit, a non-volatile memory (e.g., the non-volatile memory 134 of FIG. 1) operatively connected with the processor and storing at least one file, and a volatile memory (e.g., the volatile memory 132 of FIG. 1) operatively connected to the processor, in which the non-volatile memory stores instructions that cause, when executed, the processor, to establish a first area (e.g., the first area 302 of FIG. 3A) and a second area (e.g., the second area 304 of FIG. 3A) on the volatile memory, to store data of a first type (e.g., a read-only page) related to the at least one file in the first area, to store data of at least one second type (e.g., an anonymous page, etc.) that is not related to the data of the first type and/or the at least one file in the second area, to receive a request for storing one of the data of the at least one second type, which exceeds a selected threshold value, and to control the first area to be in a state of storing one of the data of the at least one second type instead of the data of the first type, upon receipt of the request.

According to various embodiments of the present disclosure, the instructions may include an instruction that causes the processor to store the one of the data of the at least one second type in the first area.

According to various embodiments of the present disclosure, the data of the first type may include read-only data stored in the non-volatile memory.

According to various embodiments of the present disclosure, the data of the first type may be related to an operating system (OS).

According to various embodiments of the present disclosure, the electronic device may further include a camera and a display (e.g., the display 160 of FIG. 1) operatively connected with the at least one processor, in which the one of the data of the at least one second type may be generated from the camera (e.g., the camera module 180 of FIG. 1) and provided to the display.

According to various embodiments of the present disclosure, the first area and the second area may be at least partially defined in physical addresses of the volatile memory.

According to various embodiments of the present disclosure, the instructions may cause the processor to store the data of the first type to a page size.

A control method for an electronic device according to various embodiments of the present disclosure includes accessing at least one page that is subject to paging-in, in response to a page-in trigger event identified during execution of a first process, paging-in the at least one page in a first area of a first memory at least partially based on a partition type in which the at least one page is stored, the at least one page being stored in a second memory, executing a second process in response to an execution request of a second process, determining whether the second process satisfies a designated condition, dropping the at least one page mapped to the first area from the first memory according to the page-in, at least partially based on a result of the determination, and allocating at least one page required for execution of the second process to the first area.

According to various embodiments of the present disclosure, the process satisfying the designated condition may include a process in which a sum of sizes of pages required for execution of the process exceeds a designated size.

According to various embodiments of the present disclosure, the control method may include dropping the at least one page mapped to the first area, when the second process satisfies the designated condition.

According to various embodiments of the present disclosure, the control method may include generating an LRU list for the dropped at least one page and temporarily store the generated LRU list in a second area of the first memory.

According to various embodiments of the present disclosure, the control method may include determining whether an available area exists in the first area, when the page-in trigger event for the dropped at least one page is identified.

According to various embodiments of the present disclosure, the control method may include determining whether page in of all the dropped at least one page in the first area is possible and paging-in the dropped at least one page in the first area, when paging-in of all the dropped at least one page in the first area is possible.

According to various embodiments of the present disclosure, the control method may include determining whether paging-in of all the dropped at least one page in the first area is possible, evicting the at least one page from the first area based on an inactive LRU list, when it is not possible for all the dropped at least one page to be paged-in, and paging-in the dropped at least one page in the first area.

According to various embodiments of the present disclosure, the control method may include limiting paging-in of another page in the first area, when the second process satisfies the designated condition.

An electronic device according to various embodiments of the present disclosure may include a processor and a memory operatively connected with the processor, in which the memory includes a first area to which a page having a first designated attribute is allocated and a second area to which a page having a second designated attribute is allocated, and the processor is configured to drop at least one page allocated to the first area in response to a memory allocation request corresponding to execution of an application, to determine whether the application is a designated application, and to allocate at least one page for execution of the application to the first area at least partially based on a result of the determination.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a first memory;
   a second memory; and
   a processor operatively connected to the first memory and the second memory, wherein the processor is configured to:
   access at least one page stored in the second memory, the at least one page being subject to paging-in, in response to a page-in trigger event identified during execution of a first process;
   page-in the at least one page in a first area of the first memory at least partially based on a partition type in which the at least one page is stored;
   execute a second process in response to an execution request of the second process;
   determine whether the second process satisfies a designated condition;
   drop the at least one page mapped to the first area from the first memory according to the page-in, at least partially based on a result of the determination; and
   allocate at least one page required for execution of the second process to the first area.

2. The electronic device of claim 1, wherein the second process satisfying the designated condition comprises at least one of a process in which a sum of sizes of pages required for execution of the process exceeds a designated size or a process instructing the processor to use the first area.

3. The electronic device of claim 1, wherein the processor is further configured to drop the at least one page mapped to the first area, when the second process satisfies the designated condition.

4. The electronic device of claim 3, wherein the processor is further configured to generate a least recently used (LRU) list for the dropped at least one page and temporarily store the generated LRU list in a second area of the first memory.

5. The electronic device of claim 3, wherein the processor is further configured to determine whether an available area exists in the first area, when the page-in trigger event for the dropped at least one page is identified.

6. A control method for an electronic device, the control method comprising:
   accessing at least one page that is subject to paging-in, in response to a page-in trigger event identified during execution of a first process;
   paging-in the at least one page in a first area of a first memory at least partially based on a partition type in which the at least one page is stored, the at least one page being stored in a second memory;
   executing a second process in response to an execution request of a second process;
   determining whether the second process satisfies a designated condition;
   dropping the at least one page mapped to the first area from the first memory according to the page-in, at least partially based on a result of the determination; and
   allocating at least one page required for execution of the second process to the first area.

7. The control method of claim 6, wherein the second process satisfying the designated condition comprises at least one of a process in which a sum of sizes of pages required for execution of the process exceeds a designated size or a process instructing a processor to use the first area.

8. The control method of claim 6, further comprising dropping the at least one page mapped to the first area, when the second process satisfies the designated condition.

9. The control method of claim 8, further comprising generating a least recently used (LRU) list for the dropped at least one page and temporarily storing the generated LRU list in a second area of the first memory.

10. The control method of claim 8, further comprising determining whether an available area exists in the first area, when the page-in trigger event for the dropped at least one page is identified.

11. The control method of claim 10, further comprising:
determining whether paging-in of all the dropped at least one page in the first area is possible; and
paging-in the dropped at least one page in the first area, when paging-in of all the dropped at least one page in the first area is possible.

12. The control method of claim 10, further comprising:
determining whether paging-in of all the dropped at least one page in the first area is possible;
evicting the at least one page from the first area based on an inactive LRU list, when it is not possible for all the dropped at least one page to be paged-in; and
paging-in the dropped at least one page in the first area.

13. The control method of claim 6, further comprising limiting paging-in of another page in the first area, when the second process satisfies the designated condition.

14. An electronic device comprising:
a housing;
a communication circuit;
at least one processor operatively connected with the communication circuit;
a non-volatile memory operatively connected with the processor and storing at least one file; and
a volatile memory operatively connected to the processor,
wherein the non-volatile memory stores instructions that cause, when executed, the processor, to:
establish a first area and a second area on the volatile memory;
store data of a first type related to the at least one file in the first area;
store data of at least one second type that is not related to the data of the first type and/or the at least one file in the second area;
receive a request for storing one of the data of the at least one second type, which exceeds a selected threshold value; and
control the first area to be in a state of storing one of the data of the at least one second type instead of the data of the first type, upon receipt of the request.

15. The electronic device of claim 14, wherein the instructions comprise an instruction that causes the processor to store the one of the data of the at least one second type in the first area.

* * * * *